(12) United States Patent
Hara et al.

(10) Patent No.: US 10,183,724 B2
(45) Date of Patent: Jan. 22, 2019

(54) BICYCLE HYDRAULIC OPERATING SYSTEM

(71) Applicant: Shimano Inc., Sakai, Osaka (JP)

(72) Inventors: Nobukatsu Hara, Osaka (JP); Kenji Kamada, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/359,084

(22) Filed: Nov. 22, 2016

(65) Prior Publication Data

US 2018/0141612 A1  May 24, 2018

(51) Int. Cl.
*B62L 3/00* (2006.01)
*B62L 3/02* (2006.01)
*B62K 23/06* (2006.01)
*B62M 25/04* (2006.01)
*B62K 21/12* (2006.01)

(52) U.S. Cl.
CPC .............. *B62L 3/023* (2013.01); *B62K 23/06* (2013.01); *B62M 25/04* (2013.01); *B62K 21/125* (2013.01)

(58) Field of Classification Search
CPC ................................ B62L 3/023; B62K 23/06
See application file for complete search history.

(56) References Cited

U.S. PATENT DOCUMENTS

| 4,245,522 | A | * | 1/1981 | Robinson | B62K 21/12 74/480 R |
| 4,930,798 | A | * | 6/1990 | Yamazaki | B62K 21/125 188/2 D |
| 5,094,322 | A | * | 3/1992 | Casillas | B62L 3/00 188/2 D |
| 5,850,761 | A | | 12/1998 | Sugimoto | |
| 5,941,125 | A | | 8/1999 | Watarai et al. | |
| 6,651,790 | B2 | * | 11/2003 | Juan | B62L 3/08 188/151 A |

(Continued)

FOREIGN PATENT DOCUMENTS

| DE | 10219496 B4 * | 7/2004 | ............ B60T 11/101 |
| EP | 2336017 A1 * | 6/2011 | ............ B60T 11/046 |

(Continued)

OTHER PUBLICATIONS

Shimano XTR Rapidfire Ferndedienung, SL-SS95, 1998, Germany.

*Primary Examiner* — Victor L MacArthur
(74) *Attorney, Agent, or Firm* — Global IP Counselors, LLP

(57) ABSTRACT

A bicycle hydraulic operating system is basically provided with a first base member, a piston, a first operating member, a second base member and a second operating member. The first base member includes a first bicycle fixing structure and a hydraulic cylinder defining a cylinder bore. The piston is movably disposed in the cylinder bore of the first base member. The first operating member is movably mounted to the first base member. The first operating member is operatively coupled to the piston to move the piston in the cylinder bore of the first base member. The second base member includes a second bicycle fixing structure. The second operating member is movably mounted to the second base member. The second operating member is operatively coupled to the piston to move the piston in the cylinder bore of the first base member.

14 Claims, 19 Drawing Sheets

(56) References Cited

U.S. PATENT DOCUMENTS

| | | | |
|---|---|---|---|
| 7,461,724 B2* | 12/2008 | Nago | B62L 3/023 188/2 D |
| 7,540,147 B2 | 6/2009 | Takizawa et al. | |
| 7,938,234 B2* | 5/2011 | Jinbo | B60T 11/046 188/2 D |
| 8,201,670 B2* | 6/2012 | Tetsuka | B62L 1/10 188/24.22 |
| 2006/0185940 A1* | 8/2006 | Tsai | B62L 3/02 188/24.12 |
| 2008/0251334 A1 | 10/2008 | Takizawa et al. | |
| 2015/0001018 A1* | 1/2015 | Kariyama | B62L 3/023 188/344 |
| 2015/0151811 A1* | 6/2015 | Riley | B62L 3/08 188/17 |

FOREIGN PATENT DOCUMENTS

| | | | |
|---|---|---|---|
| JP | 08-183492 A | 7/1994 | |
| JP | 08-183491 A | 7/1996 | |

\* cited by examiner

BICYCLE HYDRAULIC OPERATING SYSTEM

BACKGROUND

Field of the Invention

This invention generally relates to a bicycle hydraulic operating system. More specifically, the present invention relates to a bicycle hydraulic operating system having first and second operating members that move a piston in a cylinder bore to actuate a hydraulically operated bicycle component.

Background Information

In recent years, some high performance bicycles have been provided with one or more hydraulically operated bicycle components. For example, some bicycles are provided with a hydraulic brake system in which a hydraulically operated brake device is actuated by hydraulic fluid in response to operation of a brake lever. Typically, the brake lever is attached to a bicycle handlebar and fluidly connected to the hydraulically operated brake device by a hose. The brake lever is usually part of a brake operating device (e.g., a bicycle hydraulic operating device) that attaches the brake lever to the bicycle handlebar. The brake operating device typically includes a master piston that is slidably disposed in a cylinder bore of a master cylinder, and which is actuated by the brake lever.

SUMMARY

Generally, the present disclosure is directed to various features of a bicycle hydraulic operating system.

In view of the state of the known technology and in accordance with a first aspect of the present disclosure, a bicycle hydraulic operating system is basically provided that comprises a first base member, a piston, a first operating member, a second base member and a second operating member. The first base member includes a first bicycle fixing structure and a hydraulic cylinder defining a cylinder bore. The piston is movably disposed in the cylinder bore of the first base member. The first operating member is movably mounted to the first base member. The first operating member is operatively coupled to the piston to move the piston in the cylinder bore of the first base member. The second base member includes a second bicycle fixing structure. The second operating member is movably mounted to the second base member. The second operating member is operatively coupled to the piston to move the piston in the cylinder bore of the first base member. Advantageously according to the first aspect of the present invention, the bicycle hydraulic operating system provides a user with increased flexibility in operating the piston by providing the first and second operating members.

In accordance with a second aspect of the present invention, the bicycle hydraulic operating system according to the first aspect is configured so that the second operating member is operatively coupled to the first operating member. Advantageously according to the second aspect of the present invention, the bicycle hydraulic operating system can be manufactured relatively easily by operating the piston with the second operating member via the first operating member.

In accordance with a third aspect of the present invention, the bicycle hydraulic operating system according to the second aspect further comprises a cable interconnecting the second operating member to the first operating member such that movement of the second operating member moves the first operating member. Advantageously according to the third aspect of the present invention, the bicycle hydraulic operating system can be installed on a bicycle in a variety of configurations by using a cable to interconnect the first and second operating members.

In accordance with a fourth aspect of the present invention, the bicycle hydraulic operating system according to the third aspect is configured so that the first operating member has a first, attachment portion to which the cable is attached, and the second operating member has a second attachment portion to which the cable is attached. Advantageously according to the fourth aspect of the present invention, the interconnection between the first and second operating members can be achieved without any complicated structure.

In accordance with a fifth aspect of the present invention, the bicycle hydraulic operating system according to the fourth aspect is configured so that the first operating member includes a first mounted portion that is pivotally mounted on the first base member about a pivot axis, and a first user operating portion that extends from the first mounted portion to a first free end. The first attachment portion is arranged between the pivot axis of the first operating member and the first free end of the first user operating portion. Advantageously according to the fifth aspect of the present invention, the first operating member can be easily operated by a user.

In accordance with a sixth aspect of the present invention, the bicycle hydraulic operating system according to the fourth or fifth aspects is configured so that the cable includes an outer casing and an inner wire slidably disposed inside the outer casing. The inner wire is attached to the first and second attachment portions. Advantageously according to the sixth aspect of the present invention, the interconnection between the first and second operating members can be achieved with a conventional cable.

In accordance with a seventh aspect of the present invention, the bicycle hydraulic operating system according to any one of the third to sixth aspects is configured so that the first base member includes a cable guide. Advantageously according to the seventh aspect of the present invention, the cable can be simply attached to the first base member.

In accordance with an eighth aspect of the present invention, the bicycle hydraulic operating system according to the seventh aspect is configured so that the cable guide is disposed outside of the first base member. Advantageously according to the eighth aspect of the present invention, the cable guide can be located in an area that does not require other parts of the bicycle hydraulic operating system to be rearranged, and the cable can be more simply attached to the first base member.

In accordance with a ninth aspect of the present invention, the bicycle hydraulic operating system according to any one of the first to eighth aspects further comprises a control unit disposed on the first base member, and configured to operate an additional component. Advantageously according to the ninth aspect of the present invention, the bicycle hydraulic operating system can also be used to operate an additional component.

In accordance with a tenth aspect of the present invention, the bicycle hydraulic operating system according to the ninth aspect is configured so that the control unit includes an electric switch. Advantageously according to the tenth aspect of the present invention, the control unit can be more simple to assembly than a mechanical operating unit.

In accordance with an eleventh aspect of the present invention, the bicycle hydraulic operating system according to the tenth aspect is configured so that the first operating member includes a first mounted portion that is pivotally mounted on the first base member about a pivot axis, and a first user operating portion that extends from the first attachment portion to a first free end. The electric switch is disposed on the first user operating portion of the first operating member. Advantageously according to the eleventh aspect of the present invention, the electric switch can be easily operated.

In accordance with a twelfth aspect of the present invention, the bicycle hydraulic operating system according to the tenth or eleventh aspect further comprises a wireless communication unit electrically coupled to the electric switch. Advantageously according to the twelfth aspect of the present invention, the need to route electrical cables along a bicycle frame can be eliminated.

In accordance with a thirteenth aspect of the present invention, the bicycle hydraulic operating system according to the ninth aspect is configured so that the control unit is a mechanical operating unit having a cable takeup member. Advantageously according to the thirteenth aspect of the present invention, the bicycle hydraulic operating system can be used to control less costly mechanical components.

In accordance with a fourteenth aspect of the present invention, the bicycle hydraulic operating system according to the thirteenth aspect further comprises a third operating member operatively coupled to the control unit to operate the control unit in response to operation of the third operating member. Advantageously according to the fourteenth aspect of the present invention, the control unit can be easily operated.

In accordance with a fifteenth aspect of the present invention, the bicycle hydraulic operating system according to the thirteenth or fourteenth aspects is configured so that the first operating member is operatively coupled to the control unit to operate the control unit in response to movement of the first operating member in a non-piston operating direction. Advantageously according to the fifteenth aspect of the present invention, the control unit can be operated using a conventional two lever control unit.

In accordance with a sixteenth aspect of the present invention, the bicycle hydraulic operating system according to any one of the first to fifteenth aspects is configured so that the first bicycle fixing structure is configured to be disposed on an end portion of a handlebar. Advantageously according to the sixteenth aspect of the present invention, the first base member can be aerodynamically attached to a bicycle.

In accordance with a seventeenth aspect of the present invention, the bicycle hydraulic operating system according to any one of the first to fifteenth aspects is configured so that the second bicycle fixing structure is configured to be disposed on an end portion of a handlebar. Advantageously according to the seventeenth aspect of the present invention, the second base member can be aerodynamically attached to a bicycle.

In accordance with an eighteenth aspect of the present invention, the bicycle hydraulic operating system according to any one of the first to fifteenth aspects is configured so that the first base member includes a gripping section configured to be gripped by a user, a handlebar receiving recess arranged at a first end portion of the gripping section and a pommel section extending from the gripping section at a second end portion of the gripping section opposite to the first end portion. Advantageously according to the eighteenth aspect of the present invention, the gripping section can be gripped by a user so that the user is provided with an additional rider position.

In accordance with a nineteenth aspect of the present invention, the bicycle hydraulic operating system according to the eighteenth aspect is configured so that the first operating member includes a first mounted portion that is pivotally mounted to the second end portion about a pivot axis, and a first user operating portion that extends from the second end portion to a first free end. The first base member includes a cable guide that is disposed on the gripping section. Advantageously according to the nineteenth aspect of the present invention, the cable guide can be located in an area that does not require other parts of the bicycle hydraulic operating system to be rearranged, and the cable can be more simply attached to the first base member.

In accordance with a twentieth aspect of the present invention, a bicycle hydraulic operating device is basically provided that comprises a base member, a piston and an operating member. The base member includes a first bicycle fixing structure and a hydraulic cylinder defining a cylinder bore. The piston is movably disposed in the cylinder bore of the base member. The operating member is movably mounted to the base member. The operating member is operatively coupled to the piston to move the piston in the cylinder bore of the base member. The operating member has a cable attachment portion. Advantageously according to the twentieth aspect of the present invention, the bicycle hydraulic operating device provides a user with increased flexibility in operating the piston by providing the operating member with a cable attachment portion for installing a remote operating member that moves the piston in the cylinder bore of the base member.

Also other objects, features, aspects and advantages of the disclosed bicycle hydraulic operating system will become apparent to those skilled in the bicycle field from the following detailed description, which, taken in conjunction with the annexed drawings, discloses one embodiment of the bicycle hydraulic operating system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
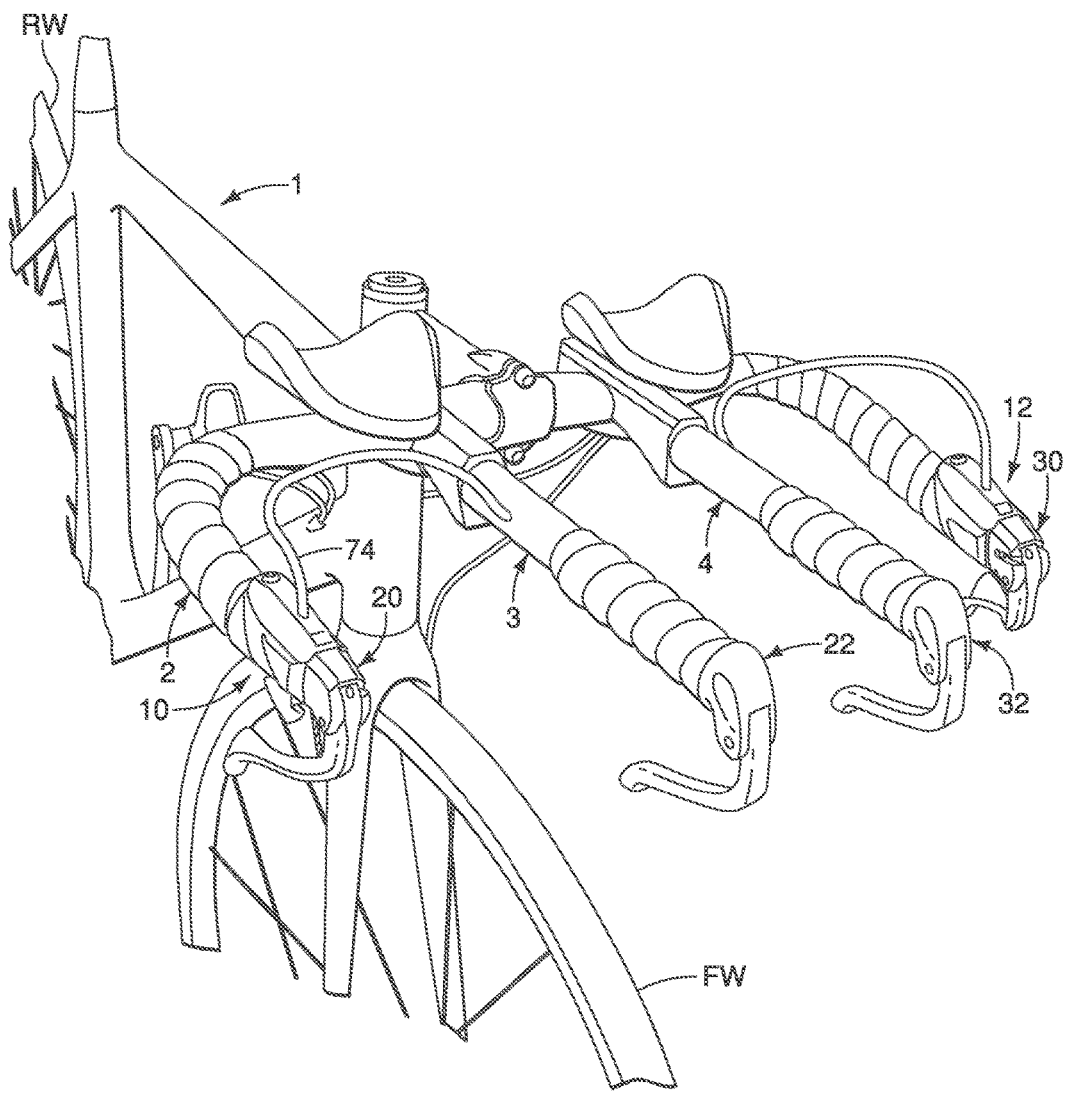
FIG. 1 is a perspective view of a portion of a bicycle that is equipped with first and second bicycle hydraulic operating systems in accordance with a first illustrative embodiment.

Referring initially to FIG. 1, a portion of a bicycle 1 is illustrated having a first handlebar 2 and a pair of second handlebars 3 and 4 that support a first bicycle hydraulic operating system 10 and a second bicycle hydraulic operating system 12 in accordance with a first embodiment. Here in the first embodiment, the bicycle 1 is a time trial bicycle. The first handlebar 2 is a bull horn handlebar, while and the second handlebars 3 and 4 are attachment bars that are attached to the first handlebar 2. The second handlebars 3 and 4 are aero bars. Alternatively, the first handlebar 2 and the second handlebars 3 and 4 can be formed as a single non-separable unit. Accordingly, in this present disclosure, the first handlebar 2 and the second handlebars 3 and 4 can be considered a single handlebar even though the second handlebars 3 and 4 are detachable from the first handlebar 2. Basically, as seen in FIG. 1, the first bicycle hydraulic operating system 10 is mounted on a right hand side of the first handlebar 2 and on the second handlebar 3 such that the first bicycle hydraulic operating system 10 is operated by the rider's right hand. On the other hand, the second bicycle hydraulic operating system 12 is mounted on a left hand side of the first handlebar 2 and on the second handlebar 4 such that the second bicycle hydraulic operating system 12 is operated by the rider's left hand.

Here in the first embodiment, each of the first and second bicycle hydraulic operating systems 10 and 12 includes both a braking function and a shifting function. However, it will be apparent to those skilled in the bicycle field from this disclosure that each of the first and second bicycle hydraulic operating systems 10 and 12 can be configured to only perform a single function such as a braking function or a shifting function. Also in the first embodiment, the braking function is hydraulically carried out in each of the first and second bicycle hydraulic operating systems 10 and 12, while the shifting function is mechanically carried out in each of the first and second bicycle hydraulic operating systems 10 and 12. However, it will be apparent to those skilled in the bicycle field from this disclosure that each of the first and second bicycle hydraulic operating systems 10 and 12 are no limited to the illustrated configuration.

Figure 2:
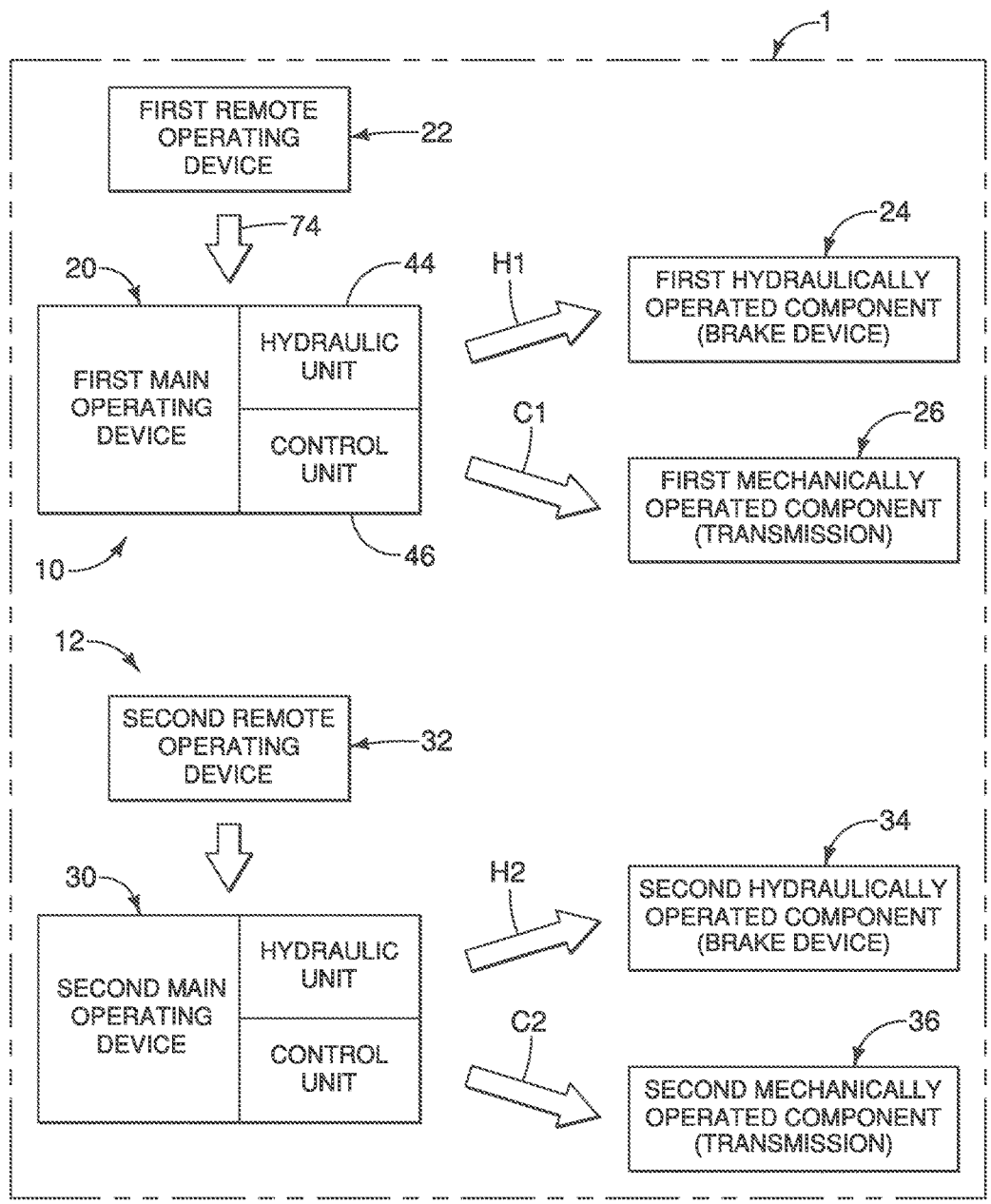
FIG. 2 is a block diagram of an overall of the first and second bicycle hydraulic operating systems illustrated in FIG. 1.

Referring now to FIG. 2, the first and second bicycle hydraulic operating systems 10 and 12 are diagrammatically illustrated in accordance with the first embodiment. The first bicycle hydraulic operating system 10 basically comprises a first main operating device 20, a first remote operating device 22, a first hydraulically operated component 24 and a first mechanically operated component 26. Here in the first embodiment, the first main operating device 20 is configured to operate both the first hydraulically operated component 24 and the first mechanically operated component 26, while the first remote operating device 22 is configured to operate only the first hydraulically operated component 24 via the first main operating device 20. Similarly, the second bicycle hydraulic operating system 12 basically comprises a second main operating device 30, a second remote operating device 32, a second hydraulically operated component 34 and a second mechanically operated component 36. The second main operating device 30 is configured to operate both the second hydraulically operated component 34 and the second mechanically operated component 36, while the second remote operating device 32 is configured to operate only the second hydraulically operated component 34 via the second main operating device 30.

Here in the first embodiment, the first hydraulically operated component 24 is a hydraulic brake device such as a hydraulic brake caliper, while the first mechanically operated component 26 is a cable operated transmission (gear shifting device) such as a derailleur or an internal transmission device. Similarly, the second hydraulically operated component 34 is a hydraulic brake device such as a hydraulic brake caliper, while the second mechanically operated component 36 is a cable operated transmission such as a derailleur or an internal transmission device. With this arrangement, one of the first and second hydraulically operated components 24 and 34 is arranged to apply a braking force to a rear wheel RW (see FIG. 1) of the bicycle 1, while the other one of the first and second hydraulically operated components 24 and 34 is arranged to apply a braking force to a front wheel FW (see FIG. 1) of the bicycle 1. Also with this arrangement, one of the first and second mechanically operated components 26 and 36 is arranged to operate a front transmission (not shown), while the other one of the first and second mechanically operated components 26 and 36 is arranged to operate a rear transmission (not shown). Here, the first main operating device 20 is operatively coupled to the first hydraulically operated component 24 (the hydraulic brake device) via a hydraulic hose H1. Similarly, the second main operating device 30 is operatively coupled to the second hydraulically operated component 34 (the hydraulic brake device) via a hydraulic hose H2. The hydraulic hoses H1 and H2 are conventional hydraulic hoses that are commonly used in the bicycle field. On the other hand, the first main operating device 20 is operatively coupled to the first mechanically operated component 26 (the cable operated shifting device) via a control cable C1. Similarly, the second main operating device 30 is operatively coupled to the second mechanically operated component 36 (the cable operated shifting device) via a control cable C2. The control cables C1 and C2 are conventional Bowden cables that each includes an inner wire and an outer casing which partially covers the inner wire.

Since the first and second main operating devices 20 and 30 are each configured to operate both the hydraulic brake device and the cable operated shifting device, the first and second main operating devices 20 and 30 are also known as bicycle brifters. In other words, a bicycle brifter is a device that includes both a braking function and a shifting function in a single unit that is mounted to the bicycle. In the first embodiment, the first and second main operating devices 20 and 30 are essentially identical in operation, except that they are mirror images of each other and they may have a different number of shift operations. Also in the first embodiment, the first and second remote operating devices 22 and 32 are essentially identical in operation, except that the first remote operating device 22 is operatively connected to the first main operating device 20 while the second remote operating device 32 is operatively connected to the second main operating device 30.

For the sake of brevity, only the first bicycle hydraulic operating system 10 will be discussed and illustrated herein. In other words, further discussion of the second bicycle hydraulic operating system 12 will be omitted for the sake of brevity. Since only the first bicycle hydraulic operating system 10 will be discussed in more detail, the first bicycle hydraulic operating system 10 will hereinafter be simply referred to as the bicycle hydraulic operating system 10. Moreover, the first main operating device 20 will hereinafter be simply referred to as the main operating device 20, and the first remote operating device 22 will hereinafter be simply referred to as the remote operating device 22.

Figure 3:
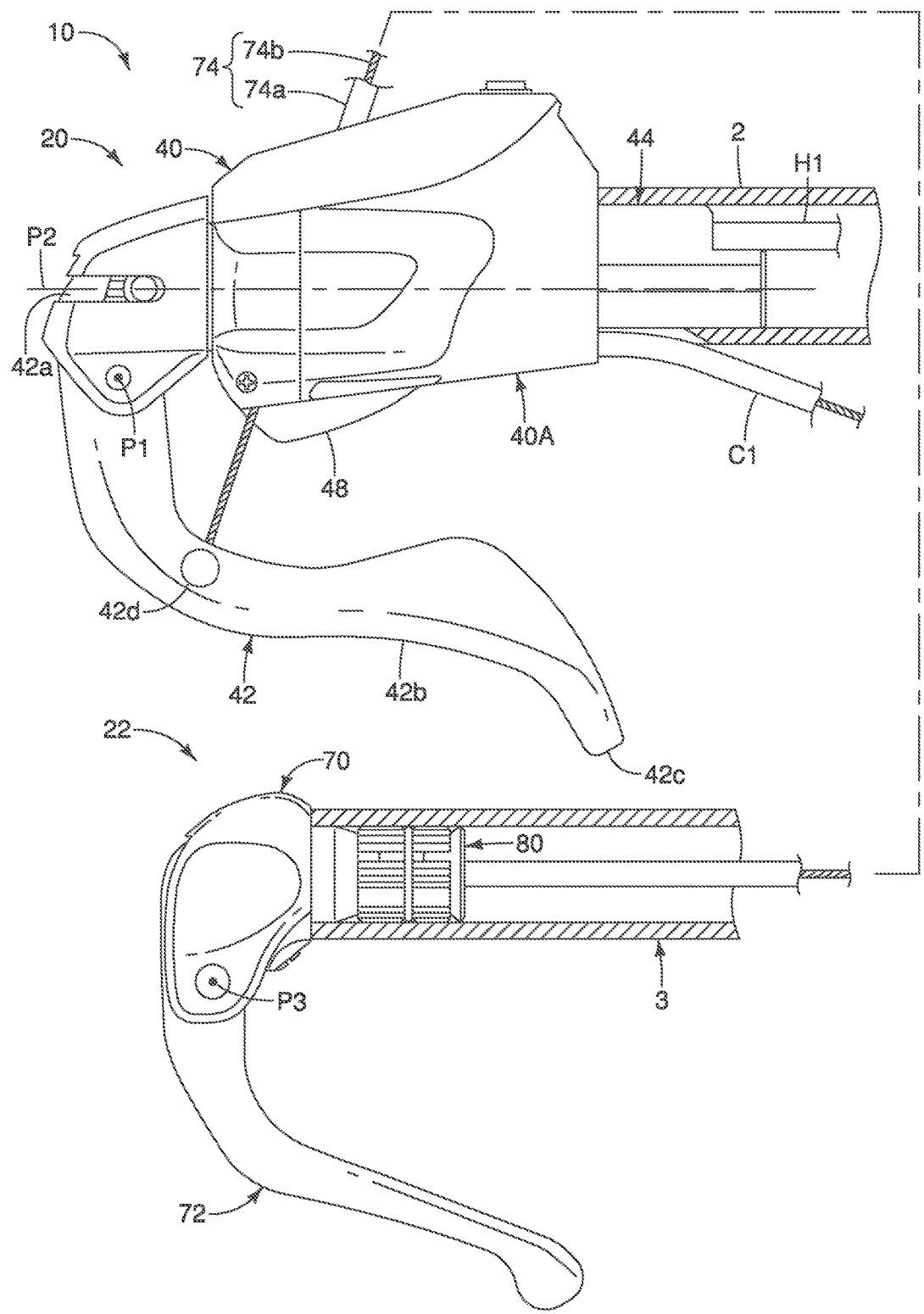
FIG. 3 is a diagrammatic view of main and remote operating devices of the first bicycle hydraulic operating system illustrated in FIG. 1 in which main and remote operating devices are in their rest positions.
Figure 4:
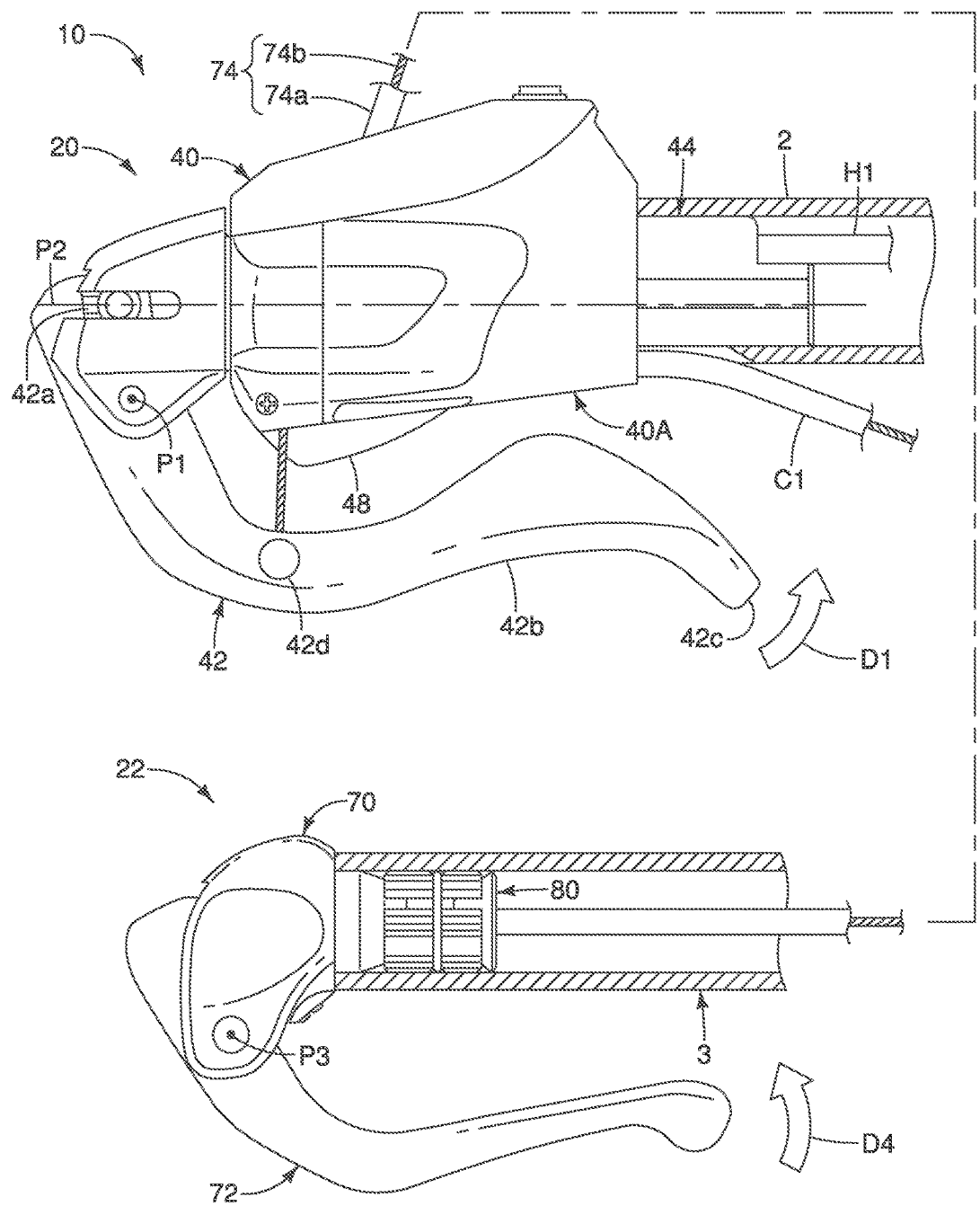
FIG. 4 is a diagrammatic view of the main and remote operating devices illustrated in FIG. 3 but with the main and remote operating devices in their operated positions as a result of the remote operating device being operated.
Figure 5:
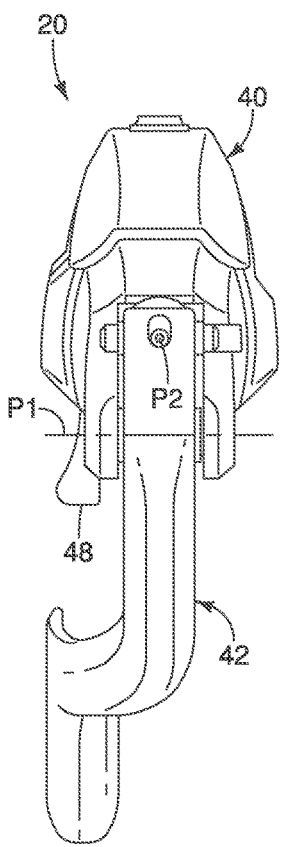
FIG. 5 is an enlarged front end elevational view of the main operating device (bicycle hydraulic operating device) illustrated in FIGS. 3 and 4 in which the main operating device is in the rest position.
Figure 8:
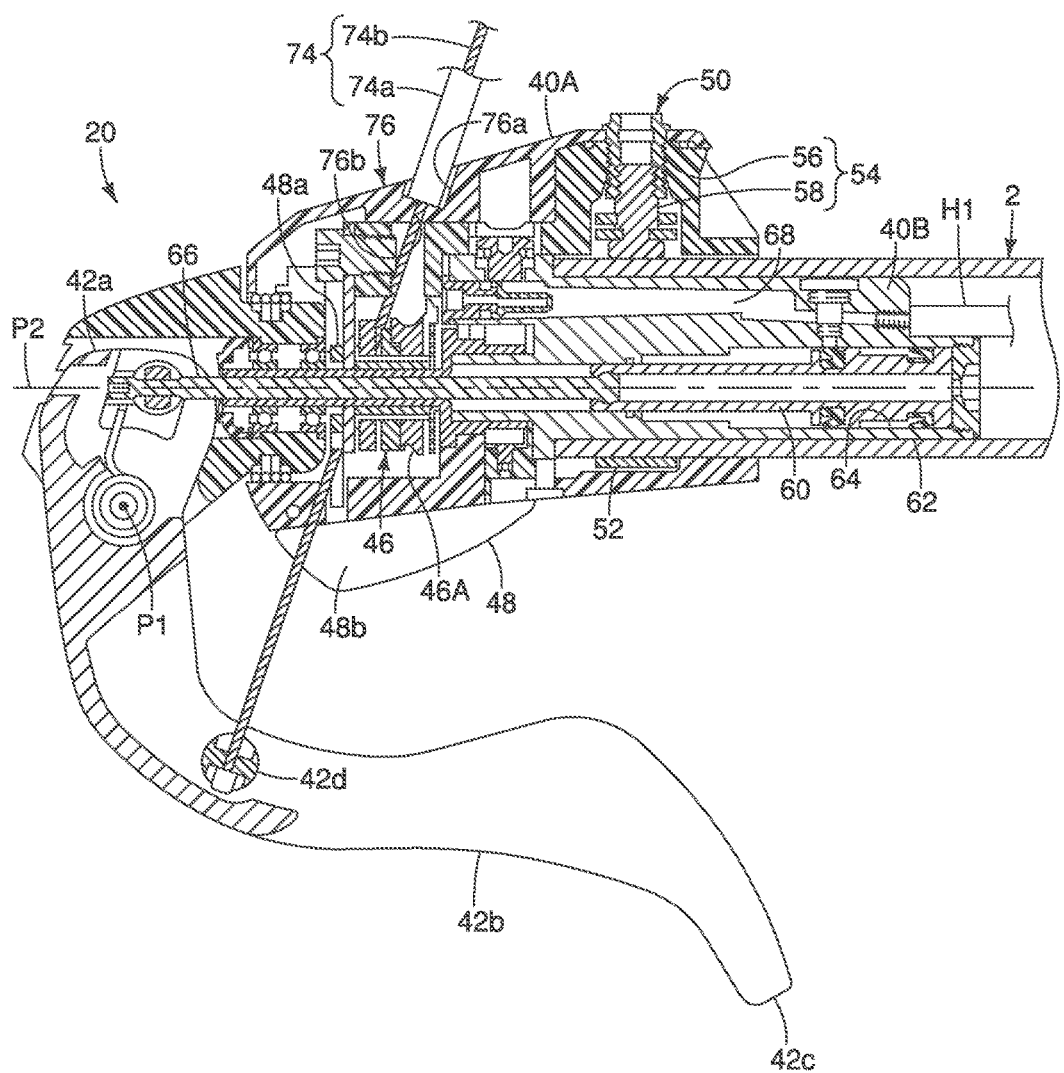
FIG. 8 is a center longitudinal cross sectional view of the main operating device (bicycle hydraulic operating device) illustrated in FIGS. 3 to 7.

Referring to FIGS. 3, 4 and 8, the main operating device 20 of the bicycle hydraulic operating system 10 basically comprises a first base member 40 and a first operating member 42. The main operating device 20 of the bicycle hydraulic operating system 10 further comprises a hydraulic unit 44 that is disposed on the first base member 40, and that is configured to operate a bicycle component (e.g., the first hydraulically operated component 24) in response to operation of the first operating member 42 in a piston operating direction D1. Thus, the main operating device 20 also can be called as a bicycle hydraulic operating device 20. The hydraulic unit 44 is fluidly connected to the first hydraulically operated component 24 by the hydraulic hose H1. When the first hydraulically operated component 24 is a hydraulic brake device, the first operating member 42 is a brake lever.

Figure 6:
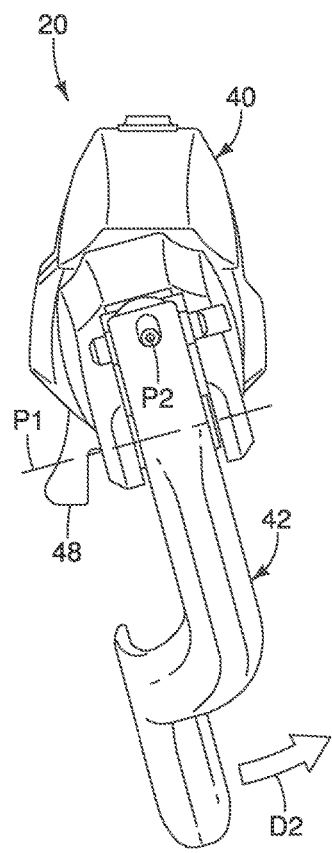
FIG. 6 is an enlarged front end elevational view of the main operating device illustrated in FIG. 5 in which a first operating member of the main operating device has been moved to an operated position from the rest position shown in FIG. 5 such that a control unit (mechanical operating unit) of the main operating device performs a wire pulling operation.
Figure 7:
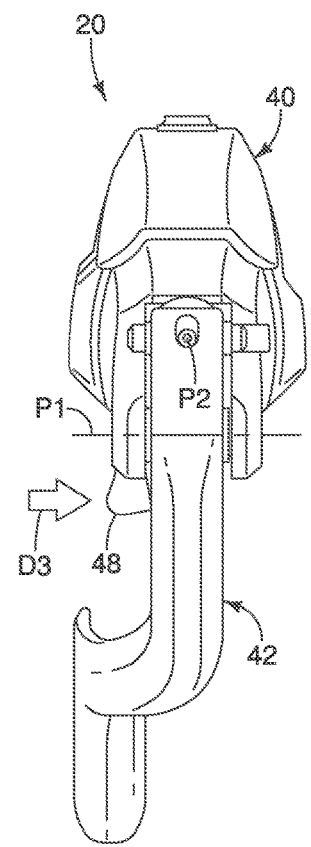
FIG. 7 is an enlarged front end elevational view of the main operating device illustrated in FIG. 5 in which a third operating member of the main operating device has been moved to an operated position shown in FIG. 5 such that a control unit of the main operating device performs a wire releasing operation.

The main operating device 20 of the bicycle hydraulic operating system 10 further comprises a control unit 46 (FIG. 8) that is disposed on the first base member 40, and that is configured to operate an additional component (e.g., the first mechanically operated component 26). However, alternatively, the control unit 46 can be omitted if needed and/or desired. In the first embodiment, the control unit 46 is a mechanical operating unit having a cable takeup member 46A. The control unit 46 is operatively connected to the first mechanically operated component 26 (the cable operated shifting device) via the control cable C1. Here, the control unit 46 is a shift unit that pulls and releases an inner wire of the control cable C1 to operate the first mechanically operated component 26. The first operating member 42 is operatively coupled to the control unit 46 to operate the control unit 46 in response to movement of the first operating member 42 in a non-piston operating direction D2 (FIG. 6). In the first embodiment, the remote operating device 22 of the bicycle hydraulic operating system 10 comprises a third operating member 48 that is also operatively coupled to the control unit 46 to operate the control unit 46 in response to operation of the third operating member 48 in an operating direction D3 (FIG. 7). In particular, the first operating member 42 is an inner wire pulling lever, while the third operating member 48 is an inner wire releasing lever.

Control (shift) units are well known in the bicycle field that pull and release an inner wire of a control cable. Thus, the control (shift) unit 46 will not be discussed in detail herein. As used herein, a mechanical control (shift) unit refers to a device that pulls and releases an inner wire of the control cable to selectively hold a cable takeup member in a plurality of predetermined positions. While the control unit 46 is a mechanical shift unit that is operated with two levers (i.e., one for pulling the inner wire of the control cable C1 and another for releasing the inner wire of the control cable C1), other types of the control unit 46 of mechanical shift units can be substituted for the control unit 46. For example, the control unit 46 can be configured to be operated by a single lever. In such a case, the first operating member 42 would be configured to only move in the piston operating direction D1.

In the first embodiment, as seen in FIG. 8, the first base member 40 includes a first base part 40A and a second base part 40B. In the first embodiment, the second base part 40B is detachably coupled to the first base part 40A. In other words, the first base part 40A is separable from the second base part 40B such that the first and second base parts 40A and 40B can be separated and reattached without damaging the first and second base parts 40A and 40B. In particular, the first and second base parts 40A and 40B are detachably coupled by a plurality of fasteners (e.g., a pair of screws not shown). Here, the first base part 40A includes several plastic (non-metallic material) pieces connected together to form a control (shift) unit housing for supporting and housing the control unit 46. The second base part 40B is constructed of a suitable metallic material that defines a hydraulic unit housing of the hydraulic unit 44.

The first operating member 42 is movably mounted to the first base member 40. In particular, the first operating member 42 is pivotally mounted to the first base part 40A of the first base member 40 for operating the hydraulic unit 44 to perform a braking operation. The first operating member 42 includes a first mounted portion 42a and a first-user operating portion 42b. The first mounted portion 42a is pivotally mounted on the first base member 40 about a pivot axis P1. In the first embodiment, the first operating member 42 is an elongated operating lever for operating the hydraulic unit 44 to perform a braking operation. The first user operating portion 42b extends from the first mounted portion 42a to a first free end 42c.

Also the first operating member 42 is pivotally mounted to the first base part 40A of the first base member 40 for operating the control unit 46 to perform a shifting operation. The first mounted portion 42a is pivotally mounted on the first base member 40 about a pivot axis P2 to operate the control unit 46. The third operating member 48 is movably mounted to the first base member 40. In particular, the third operating member 48 is pivotally mounted to the first base part 40A of the first base member 40 about the pivot axis P2. The third operating member 48 includes a third mounted portion 48a and a third user operating portion 48b. The third mounted portion 48a is primarily disposed inside of the first base part 40A, while the third user operating portion 48b is disposed outside of the first base part 40A.

The first and third operating members 42 and 48 are trigger levers that are biased to their rest positions (non-operated positions) such that they automatically return to their rest positions upon being released from an operated position. FIGS. 1, 3, 5 and 8 illustrate the main operating device 20 with its various parts in their rest positions. The term "rest position" as used herein refers to a state in which a movable part (e.g., the first and third operating members 42 and 48) remains stationary without the need of a user intervening (e.g., holding the movable part) to establish a state corresponding to the rest position. Thus, the term "rest position" can also be referred to as a non-operated position. The term "end position" as used herein refers a state in which a movable part (e.g., the first and third operating members 42 and 48) is prevent from be moved further away from the rest position in a movement direction of a movement stroke of that movable part. The term "operated position" as used herein refers a state in which a movable part (e.g., the first and third operating members 42 and 48) is moved from the rest position to a position as a result of an external force being applied to the movable part.

Referring now to FIG. 8, the main operating device 20 is a bar-end type bicycle hydraulic operating device, which herein means that the main operating device 20 is configured to be mounted to a free end of the handlebar 2 and protrude outwardly in an axial direction from the free end of the handlebar 2. In the first embodiment, the first base member 40 includes a first bicycle fixing structure 50. The first bicycle fixing structure 50 is configured to be disposed on an end portion of the handlebar 2. Basically, the first bicycle fixing structure 50 is configured to be mounted on an exterior surface of the handlebar 2. In other words, the first bicycle fixing structure 50 is an external handlebar fixing structure, which herein means that the first bicycle fixing structure 50 is configured to be mounted on an exterior surface of the handlebar 2. However, the fixing structure of the main operating device 20 can be an internal fixing structure similar to the fixing structure of the remote operating device 22.

More specifically, as seen in FIG. 8, the first bicycle fixing structure 50 includes a handlebar engagement member 52 and a tightening structure 54. The tightening structure 54 displaces the handlebar engagement member 52 towards the first base member 40 to clamp the handlebar 2 between the first base member 40 and the handlebar engagement member 52 in response to tightening of the tightening structure 54. The tightening structure 54 includes a user operated member 56, which is a member that is operated by a user to tighten or loose the tightening structure 54 to displace the handlebar engagement member 52 with respect to the first base member 40. In the first embodiment, the tightening structure 54 includes a fixing bolt 58 that is mounted to the handlebar engagement member 52. The fixing bolt 58 threadedly engages the user operated member 56, which is a nut in the first embodiment. In this way, in the first embodiment, the user operated member 56 is configured to be coupled to the handlebar engagement member 52. Thus, in the first embodiment, the external handlebar fixing structure 14 includes a band as the handlebar engagement member 52, and the user operated member 56 and the fixing bolt 58 as the tightening structure 54.

As mentioned above, the main operating device 20 includes the hydraulic unit 44. Here, the main operating device 20 of the bicycle hydraulic operating system 10 comprises a piston 60 that is part of the hydraulic unit 44. The second base part 40B of the first base member 40 includes a hydraulic cylinder 62 defining a cylinder bore 64. The piston 60 is movably disposed in the cylinder bore 64 of the first base member 40. In the first embodiment, the hydraulic cylinder 62 is configured to be at least partly disposed inside the handlebar 2. The first operating member 42 is operatively coupled to the piston 60 to move the piston 60 in the cylinder bore 64 of the first base member 40. In particular, in the first embodiment, the first operating member 42 is operatively coupled to the piston 60 by a connecting rod 66 to move the piston 60 inside the cylinder bore 64. In this way, the piston 60 is movably disposed in the cylinder bore 64 along a cylinder axis of the cylinder bore 64 as the first operating member 42 is moved front a rest position (non-actuated position) to an actuated position. In other words, the first operating member 42 is operatively coupled to the piston 60 to move the piston 60 in the cylinder bore 64 in response to actuation of the first operating member 42 from the rest position to the actuated position. As seen in FIG. 8, the second base part 40B of the first base member 40 includes a reservoir tank 68 that is fluidly connected to the cylinder bore 64. In the first embodiment, the reservoir tank 68 is configured to be at least partly disposed inside the handlebar 2.

Figure 9:
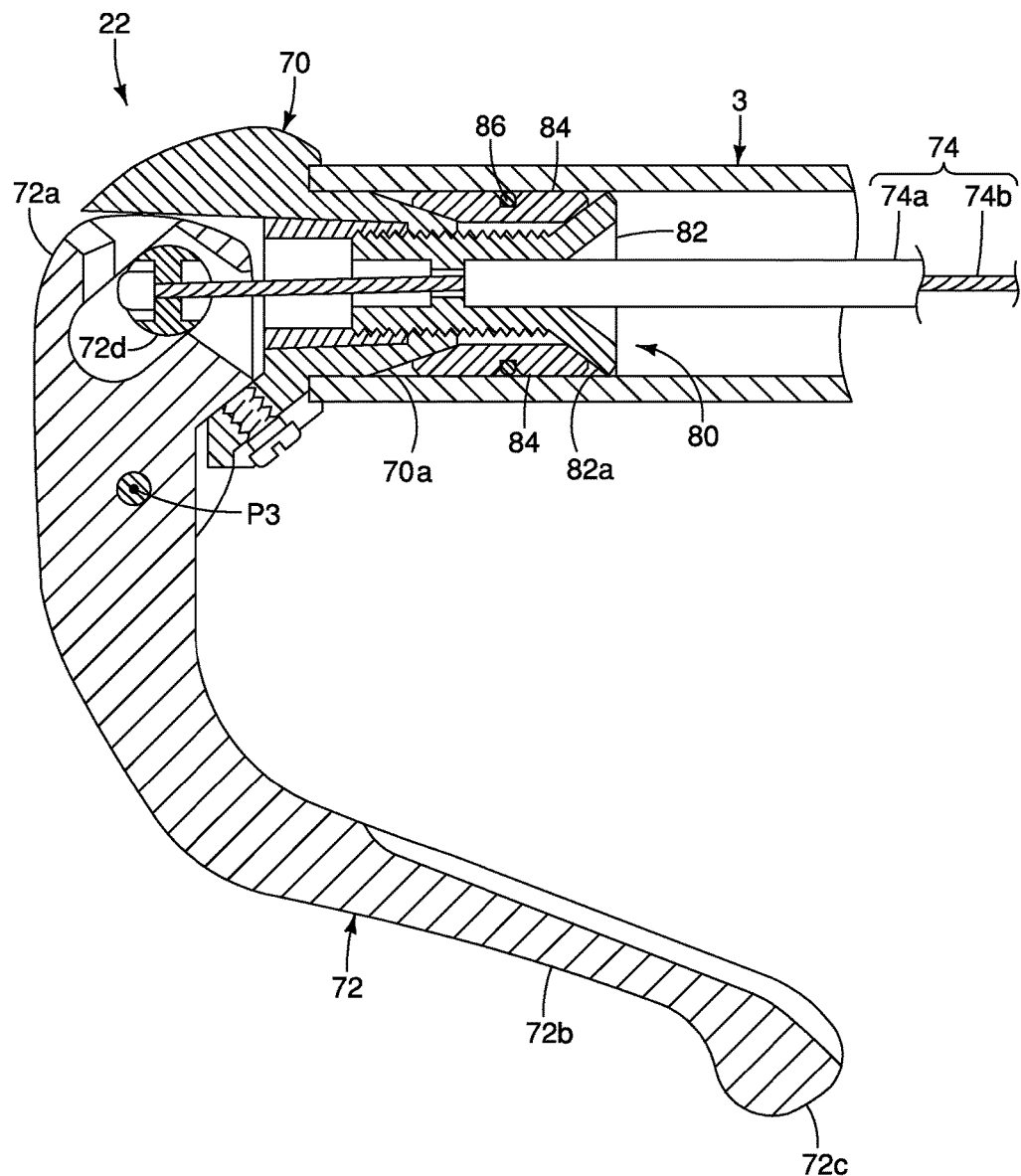
FIG. 9 is a center longitudinal cross sectional view of the remote operating device of the first bicycle hydraulic operating system illustrated in FIGS. 1, 3 and 4
Figure 10:
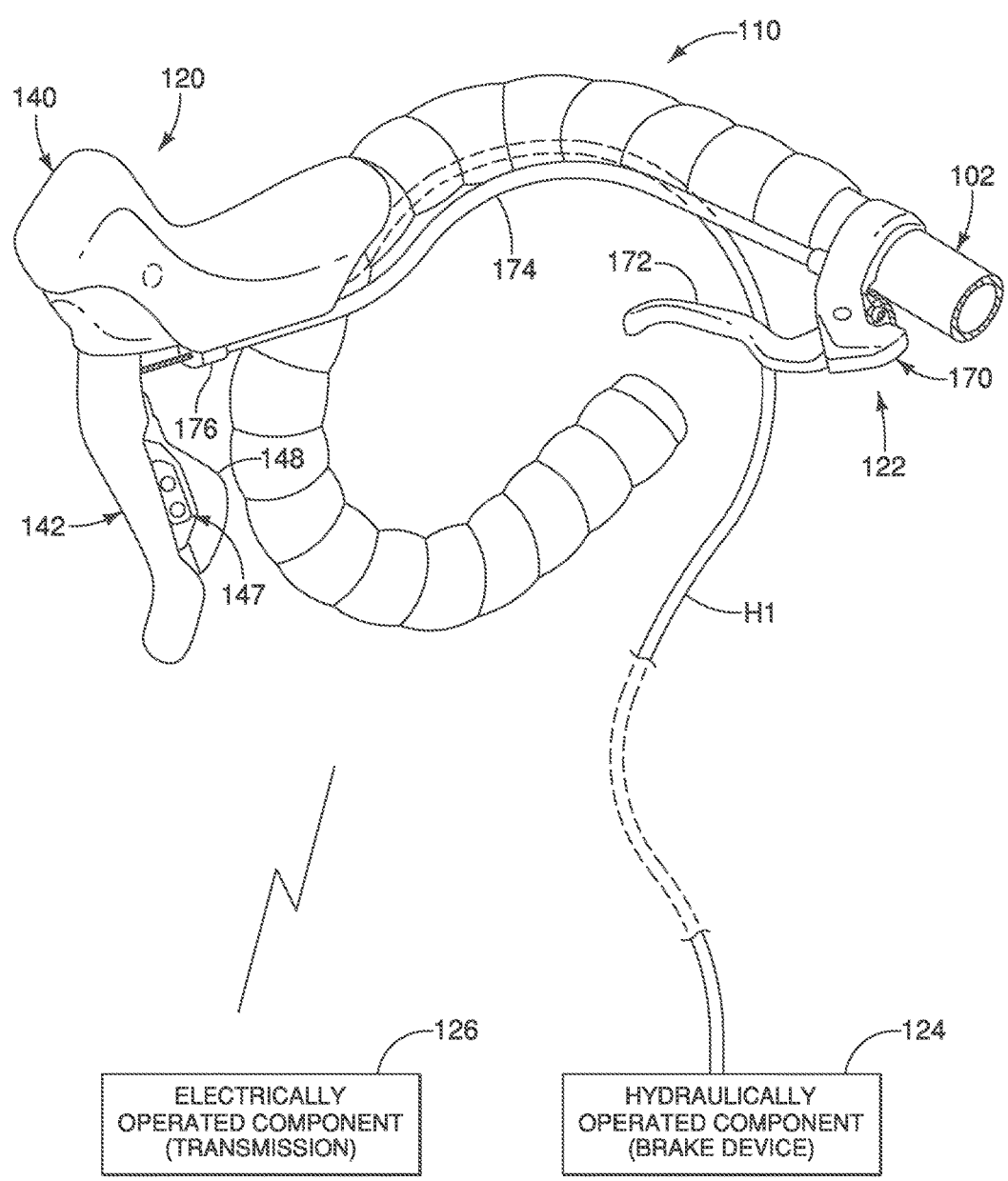
FIG. 10 is a perspective view of a portion of a bicycle that is equipped with a bicycle hydraulic operating system in accordance with a second illustrative embodiment in which main and remote operating devices are in their rest positions.

Referring now to FIGS. 3, 4 and 9, the remote operating device 22 of the bicycle hydraulic operating system 10 will now be discussed in further detail. The remote operating device 22 of the bicycle hydraulic operating system 10 basically comprises a second base member 70 and a second operating member 72. The second operating member 72 is movably mounted to the second base member 70. The second operating member 72 is configured to operate a bicycle component (e.g., the first hydraulically operated component 24) via the first operating member 42 in response to operation of the second operating member 72 being moved in an operating direction D4 as seen in FIG. 4. The second operating member 72 is a trigger lever that is biased to its rest position (non-operated position) such that the second operating member 72 automatically returns to its rest position upon being released from an operated position. The second operating member 72 includes a second mounted portion 72a and a second user operating portion 72b. The second mounted portion 72a is pivotally mounted on the second base member 70 about a pivot axis P3. The second user operating portion 72b extends from the second mounted portion 72a to a second free end 72c. In the first embodiment, the second operating member 72 is an elongated operating lever.

The remote operating device 22 is operatively coupled to the main operating device 20 to operate the first hydraulically operated component 24 via the main operating device 20. In other words, the operation of the second operating member 72 operates the hydraulic unit 44 of the main operating device 20. In the first embodiment, the second operating member 72 is operatively coupled to the first operating member 42. More specifically, in the first embodiment, the bicycle hydraulic operating system 10 further comprises a cable 74 interconnecting the second operating member 72 to the first operating member 42 such that movement of the second operating member 72 moves the first operating member 42. Here, the cable 74 includes an outer casing 74a and an inner wire 74b that is slidably disposed inside the outer casing 74a. With the structure of the cable 74, the outer casing 74a partially covers the inner wire 74b. Thus, the cable 74 is a conventional Bowden cable in the first embodiment. However, the interconnection of the first and second operating members 42 and 72 is not limited to the cable 74.

As seen in FIG. 8, the first operating member 42 has a first attachment portion 42d to which the cable 74 is attached. Specifically, the inner wire 74b is attached to the first attachment portion 42d. The first attachment portion 42d is arranged between the pivot axis P1 of the first operating member 42 and the first free end 42c of the first user operating portion 42b. Also in the first embodiment, the first base member 40 includes a cable guide 76. The cable guide 76 has an outer casing receiving portion 76a and a through hole 76b thorough which the inner wire 74b passes. Alternatively, the main operating device 20 can be configured such that the inner wire 74b is arranged to pass through the connecting rod 66.

As seen in FIG. 9, the second operating member 72 has a second attachment portion 72d to which the cable 74 is attached. Specifically, the inner wire 74b is attached to the second attachment portion 72d. The second attachment portion 72d is arranged on the opposite side of the pivot axis P3 of the second operating member 72 with respect to the second free end 72c of the second user operating portion 72b. Thus, the inner wire 74b is connected between the first and second operating members 42 and 72. In this way, the second operating member 72 is operatively coupled to the piston 60 of the main operating device 20 to move the piston 60 in the cylinder bore 64 of the first base member 40.

The second base member 70 includes a second bicycle fixing structure 80. The second bicycle fixing structure 80 is configured to be disposed on an end portion of the handlebar 3. In this embodiment the fixing structure 80 is disposed inside the handlebar 3. The second bicycle fixing structure 80 has an expander body 82, and a plurality of wedge blocks 84. The wedge blocks 84 are retained on the expander body 82 by an elastic band 86. The expander body 82 is threaded into the second base member 70. The second base member 70 is provided with a first annular inclined surface 70a, while the expander body 82 is provided with a second annular inclined surface 82a. As a result of screwing the expander body 82 into the second base member 70, the expander body 82 pushes against the wedge blocks 84 toward the second base member 70 to move the wedge blocks 84 radially outward against the internal surface of the handlebar 3. In this way, the second base member 70 is secured inside the handlebar 3. In other words, the second bicycle fixing structure 80 is an internal handlebar fixing structure, which herein means that the second bicycle fixing structure 80 is configured to be mounted on an interior surface of the handlebar 3. However, the second fixing structure 80 can be provided as an external fixing structure similar to the first fixing structure 50.

Referring now to FIGS. 10 to 14, a portion of a drop handlebar 102 is illustrated that is used to support certain components of a bicycle hydraulic operating system 110 in accordance with a second embodiment. The bicycle hydraulic operating system 110 basically comprises a main operating device 120, a remote operating device 122, a hydraulically operated component 124 and an electrically operated component 126. The main operating device 120 is operatively connected to the hydraulically operated component 124 by a hydraulic hose H1, while the main operating device 120 wirelessly communicates with the electrically operated component 126.

Here in the second embodiment, the handlebar 102 is a drop handlebar in which the main operating device 120 is attached to a curved bar section and the remote operating device 122 is attached to a straight bar section. Thus, the main operating device 120 is a drop handlebar operating device, which means that the main operating device 120 is configured to be mounted to a curved bar section of a drop handlebar.

Figure 11:
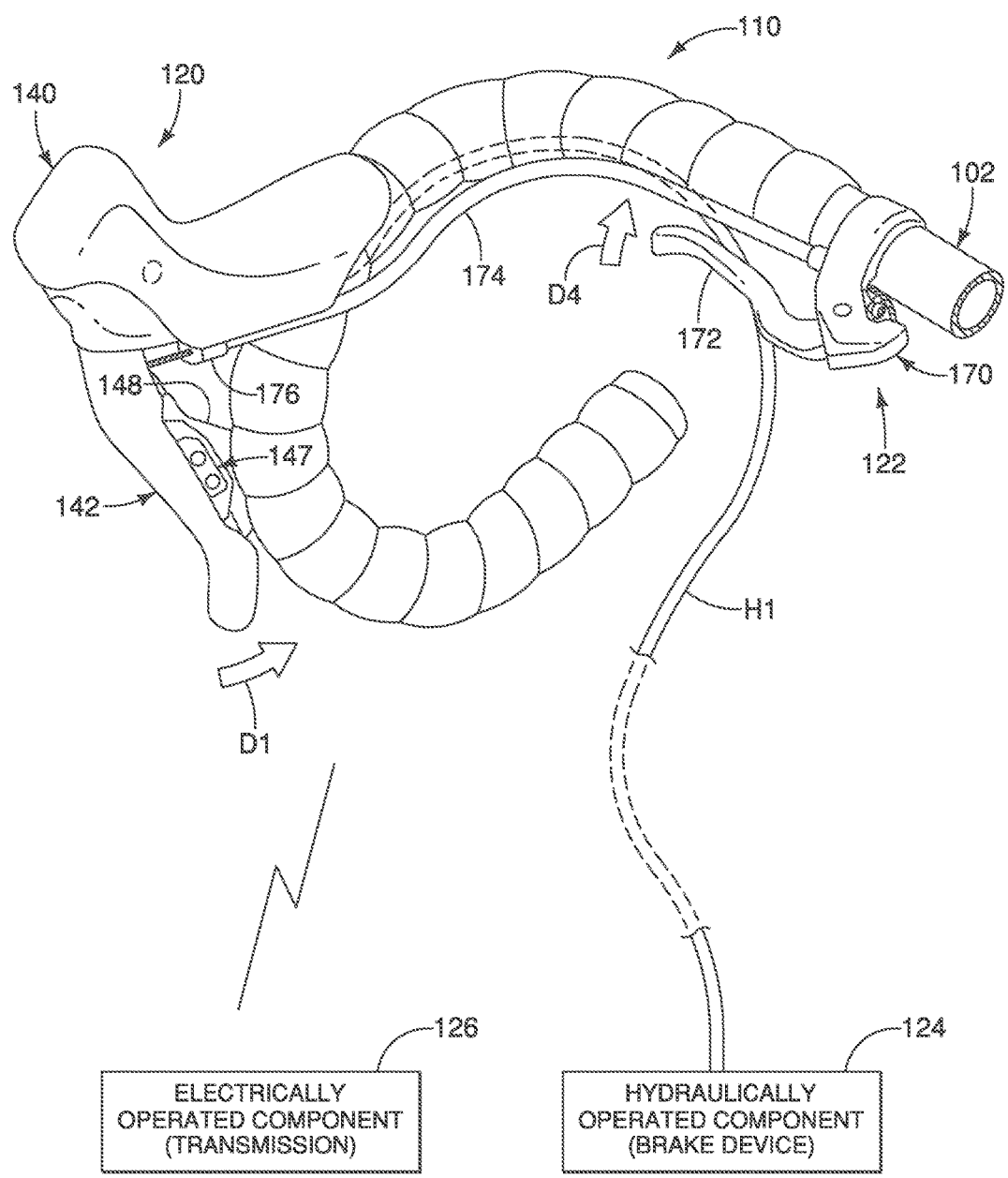
FIG. 11 is a perspective view of the portion of the bicycle illustrated in FIG. 10 but with the main and remote operating devices in their operated positions as a result of the remote operating device being operated.

The main operating device 120 of the bicycle hydraulic operating system 110 basically comprises a first base member 140 and a first operating member 142. The first operating member 142 includes a first mounted portion 142a (FIG. 13) and a first user operating portion 142b. The main operating device 120 of the bicycle hydraulic operating system 110 further comprises a hydraulic unit 144 as seen on FIG. 13. The hydraulic unit 144 is disposed on the first base member 140, and is configured to operate a bicycle component (e.g., the hydraulically operated component 124 of FIGS. 10 and 11) in response to operation of the first operating member 142 in a piston operating direction D1 as seen in FIG. 11. The hydraulic unit 144 is fluidly connected to the hydraulically operated component 124 by the hydraulic hose H1. When the hydraulically operated component 124 is a hydraulic brake device, the first operating member 142 is a brake lever.

Figure 13:
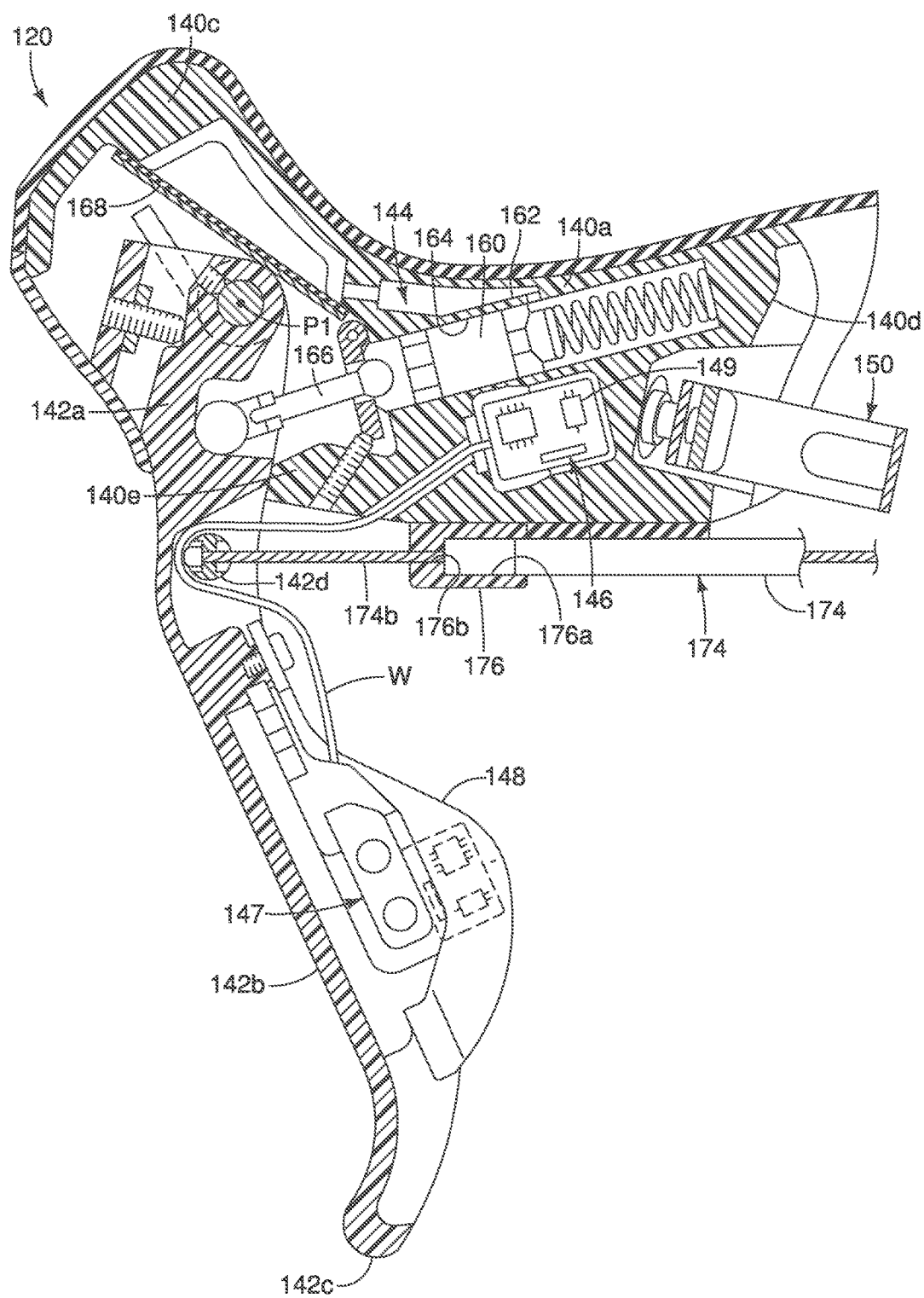
FIG. 13 is a center longitudinal cross sectional view of the main operating device (bicycle hydraulic operating device) illustrated in FIGS. 10 to 12.

The main operating device 120 of the bicycle hydraulic operating system 110 further comprises a control unit 146 that is disposed on the first base member 140, and that is configured to operate an additional component (e.g., the electrically operated component 126). However, alternatively, the control unit 146 can be omitted if needed and/or desired. In the second embodiment, the control unit 146 includes a printed circuit board having a processor, a memory device and an I/O interface. As seen in FIG. 13, the control unit 146 includes an electric switch 147. The electric switch 147 is disposed on the first operating member 142, and is electrically connected to the printed circuit board of the control unit 146 by a wire W (FIG. 13). The electric switch 147 is operated by an operating member 148 that is disposed on the first operating member 142. In the second embodiment, the operating member 148 is an operating lever that is pivotally mounted to the first operating member 142. The operating member 148 is a trigger lever that is biased to its rest position such that it automatically returns to its rest position upon being released from an operated position.

The bicycle hydraulic operating system 110 further comprises a wireless communication unit 149 that is electrically coupled to the electric switch 147. Here, the wireless communication unit 149 is disposed on the printed circuit board of the control unit 146. However, the wireless communication unit 149 can separate from the control unit 146. For example, the wireless communication unit 149 can be provided on anyone of the electric switch 147, the first base member 140, or the first operating member 142. Further, the control unit 146 also can be provided on anyone of the electric switch 147, the first base member 140, or the first operating member 142 separately or unitarily with respect to the wireless communication unit 149. Alternatively, a single unit including the control unit 146 and the wireless communication unit 149 is shown in FIG. 13 with dotted lines as one exemplary alternative construction.

The first base member 140 includes a gripping section 140a, a handlebar receiving recess 140b and a pommel section 140c. The gripping section 140a is configured to be gripped by a user. The handlebar receiving recess 140b is arranged at a first end portion 140d of the gripping section 140a. The pommel section 140c extends from the gripping section 140a at a second end portion 140e of the gripping section 140a that is opposite to the first end portion 140d.

The first operating member 142 is movably mounted to the first base member 140. The first operating member 142 is a trigger lever that is biased to its rest position such that it automatically returns to its rest position upon being released from an operated position. In particular, the first operating member 142 includes a first mounted portion 142a and a first user operating portion 142b. The first mounted portion 142a is pivotally mounted to the second end portion 140e about a pivot axis P1. The first user operating portion 142b extends from the second end portion 140e to a first free end 142c. The electric switch 147 is disposed on the first user operating portion 142b of the first operating member 142.

Referring now to FIG. 13, the first base member 140 includes a first bicycle fixing structure 150. The first bicycle fixing structure 150 is configured to be mounted to a curved portion of the drop handlebar 2. The first bicycle fixing structure 150 is a conventional bicycle fixing structure, and thus, the bicycle fixing structure 150 will not be discussed or illustrated in further detail herein.

As mentioned above, the main operating device 120 includes the hydraulic unit 144 and thus, the main operating device 120 also can be called as a bicycle hydraulic operating device 120. Here, as seen in FIG. 13, the main operating device 120 of the bicycle hydraulic operating system 110 comprises a piston 160 that is part of the hydraulic unit 144. The first base member 140 includes a hydraulic cylinder 162 defining a cylinder bore 164. The piston 160 is movably disposed in the cylinder bore 164 of the first base member 140. The first operating member 142 is operatively coupled to the piston 160 to move the piston 160 in the cylinder bore 164 of the first base member 140. In particular, in the first embodiment, the first operating member 142 is operatively coupled to the piston 160 by a connecting rod 166 to move the piston 160 inside the cylinder bore 164. In this way, the piston 160 is movably disposed in the cylinder bore 164 along a cylinder axis of the cylinder bore 164 as the first operating member 142 is moved from a rest position to an actuated position. In other words, the first operating member 142 is operatively coupled to the piston 160 to move the piston 160 in the cylinder bore 164 in response to actuation of the first operating member 142 from the rest position to the actuated position. As seen in FIG. 13, the pommel section 140c of the first base member 140 includes a reservoir tank 168 that is fluidly connected to the cylinder bore 164.

Figure 12:
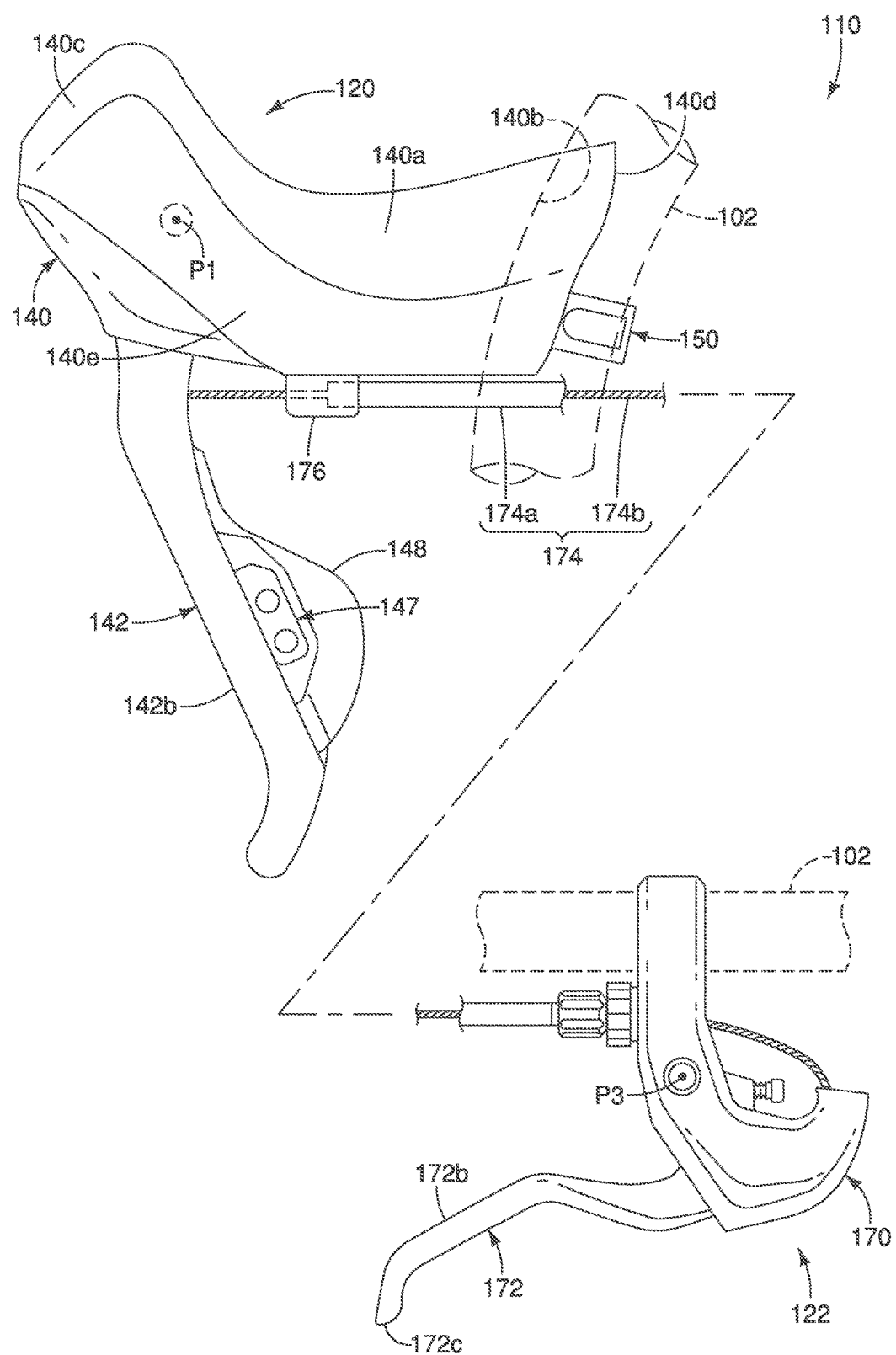
FIG. 12 is a diagrammatic view of the main and remote operating devices of the bicycle hydraulic operating system illustrated in FIGS. 10 and 11 in which the main and remote operating devices are in their rest positions.
Figure 14:
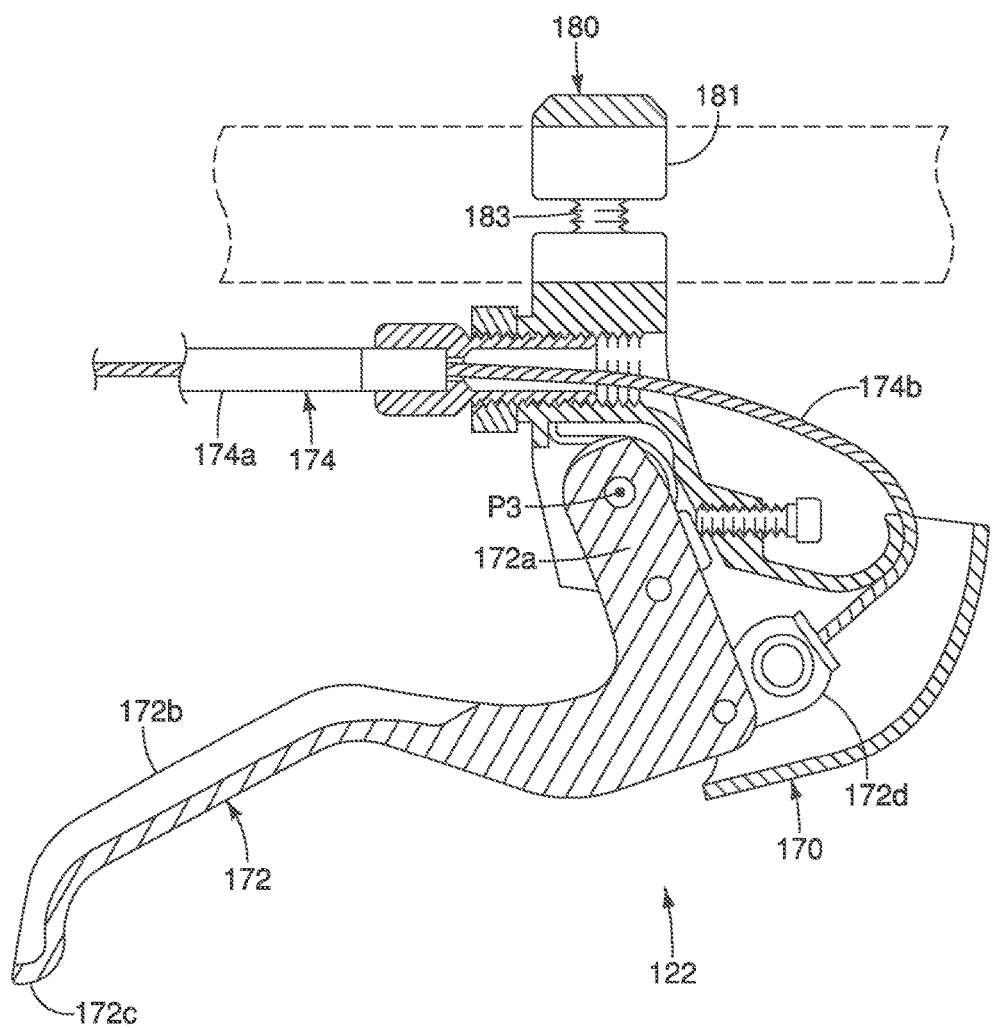
FIG. 14 is a center longitudinal cross sectional view of the remote operating device illustrated in FIGS. 10 to 12.

Referring now to FIGS. 12 and 14, the remote operating device 122 of the bicycle hydraulic operating system 110 will now be discussed in further detail. The remote operating device 122 of the bicycle hydraulic operating system 110 basically comprises a second base member 170 and a second operating member 172. The second operating member 172 is movably mounted to the second base member 170. The second operating member 172 is configured to operate a bicycle component (e.g., the first hydraulically operated component 124) via the first operating member 142 in response to operation of the second operating member 172 being moved in an operating direction D4 as seen in FIG. 11. The second operating member 172 is a trigger lever that is biased to its rest position (non-operated position) such that the second operating member 172 automatically returns to its rest position upon being released from an operated position. The second operating member 172 includes a second mounted portion 172a and a second user operating portion 172b. The second mounted portion 172a is pivotally mounted on the second base member 170 about a pivot axis P3. The second user operating portion 172b extends from the second mounted portion 172a to a second free end 172c. In the second embodiment, the second operating member 172 is an elongated operating lever.

The remote operating device 122 is operatively coupled to the main operating device 120 to operate the first hydraulically operated component 124 via the main operating device 120. In other words, the operation of the second operating member 172 operates the hydraulic unit 144 of the main operating device 120. In the second embodiment, the second operating member 172 is operatively coupled to the first operating member 142. More specifically, in the second embodiment, the bicycle hydraulic operating second 110 further comprises a cable 174 interconnecting the second operating member 172 to the first operating member 142 such that movement of the second operating member 172 moves the first operating member 142. Here, the cable 174 includes an outer casing 174a and an inner wire 174b that is slidably disposed inside the outer casing 174a. With the structure of the cable 74, the outer casing 74a partially covers the inner wire 174b. Thus, the cable 174 is a conventional Bowden cable in the first embodiment. However, the interconnection of the first and second operating members 142 and 172 is not limited to the cable 174.

As seen in FIG. 13, the first operating member 142 has a first attachment portion 142d to which the cable 174 is attached. Specifically, the inner wire 174b is attached to the first attachment portion 142d. The first attachment portion 142d is arranged between the pivot axis P1 of the first operating member 142 and the first free end 142c of the first user operating portion 142b. Also in the first embodiment, the first base member 140 includes a cable guide 176. The cable guide 176 has an outer casing receiving portion 176a and a through hole 176b thorough which the inner wire 174b passes. Here, the first cable guide 176 is disposed on the gripping section 140a. In particular, the cable guide 176 is disposed on the gripping portion 140a at location adjacent the first user operating portion 142b.

As seen in FIG. 14, the second operating member 172 has a second attachment portion 172d to which the cable 174 is attached. Specifically, the inner wire 174b is attached to the second attachment portion 172d. Thus, the inner wire 174b is connected between the first and second operating members 142 and 172. In this way, the second operating member 172 is operatively coupled to the piston 160 of the main operating device 120 to move the piston 160 in the cylinder bore 164 of the first, base member 140.

The second base member 170 includes a second bicycle fixing structure 180. The second bicycle fixing structure 180 is configured engage the exterior surface of the handlebar 102. The second bicycle fixing structure 180 has a clamp 181 and a fixing bolt 183. The fixing bolt 183 is tightened to squeeze the clamp 181 for clamping onto the handlebar 102. In this way, the second base member 170 is secured on the handlebar 102. The second bicycle fixing structure 180 is a conventional bicycle fixing structure, and thus, the second bicycle fixing structure 180 will not be discussed or illustrated in further detail herein.

Figure 15:
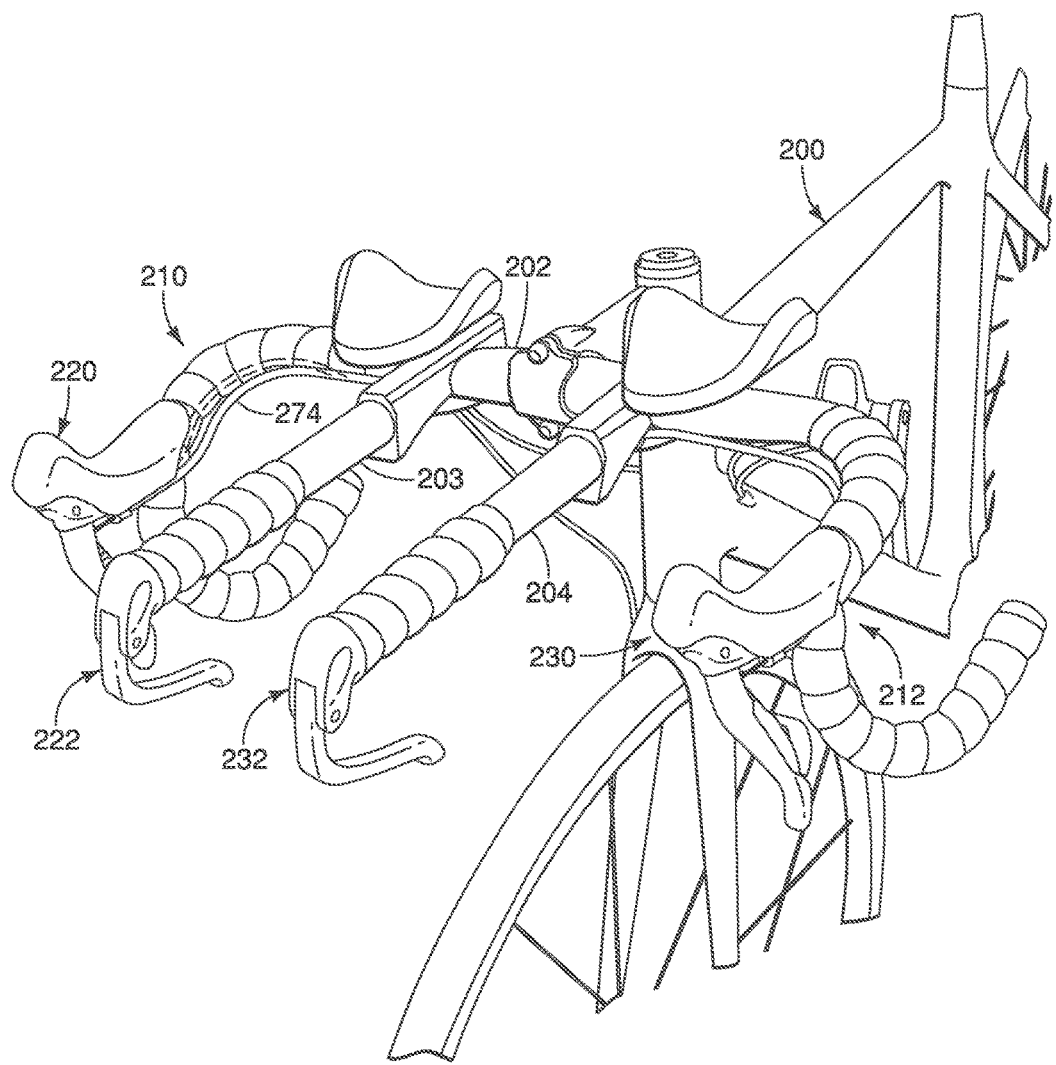
FIG. 15 is a perspective view of a portion of a bicycle that is equipped with a bicycle hydraulic operating system in accordance with a third illustrative embodiment.
Figure 16:
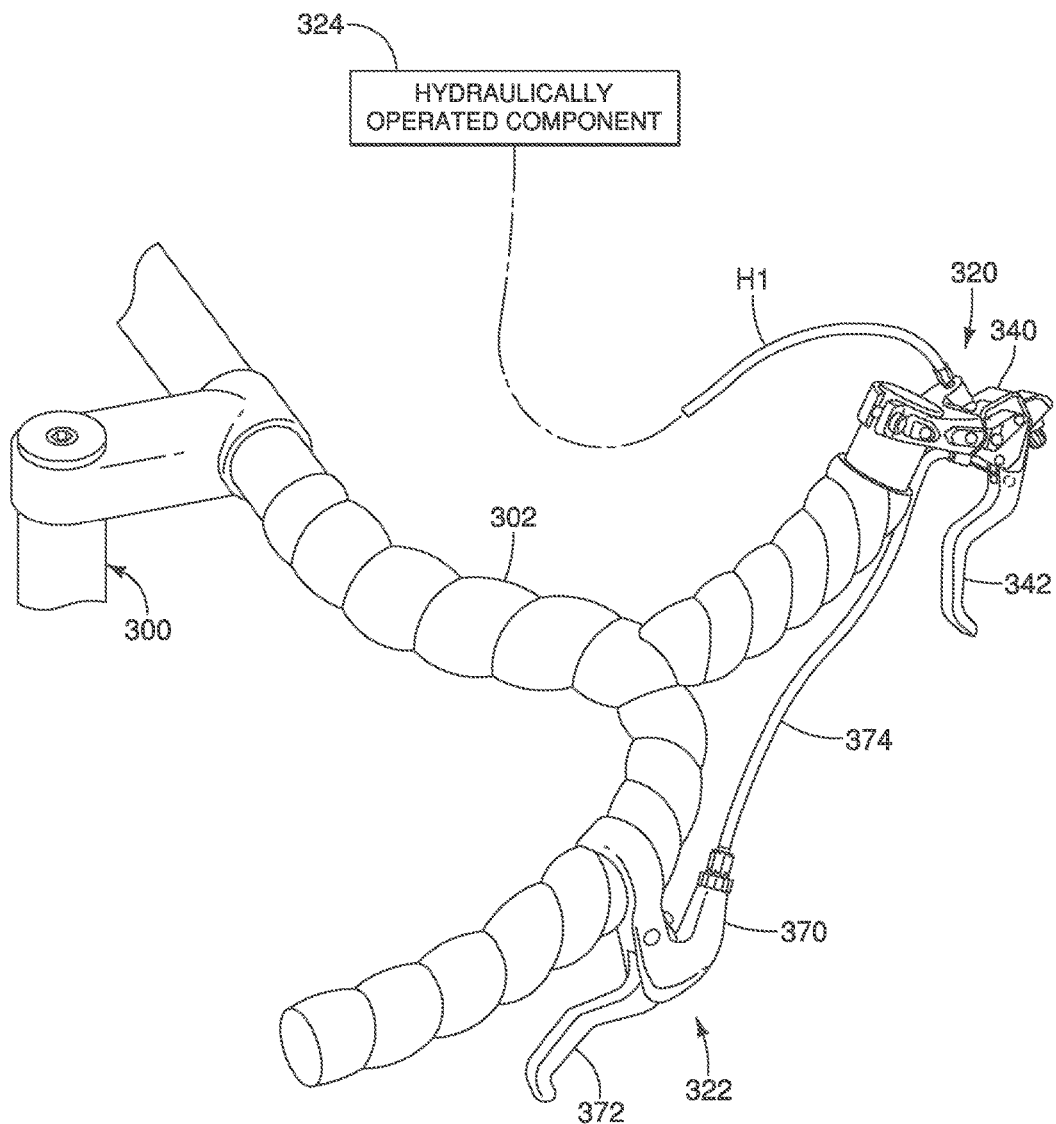
FIG. 16 is a perspective view of a portion of a bicycle that is equipped with a bicycle hydraulic operating system in accordance with a fourth illustrative embodiment in which main and remote operating devices are in their rest positions.

Referring now to FIG. 15, a portion of a bicycle 200 is illustrated having a first handlebar 202 and a pair of second handlebars 203 and 204 that that support a first bicycle hydraulic operating system 210 and a second bicycle hydraulic operating system 212 in accordance with a third embodiment. Here in the third embodiment, the first bicycle hydraulic operating system 210 comprises a first main operating device 220 and a first remote operating device 222. The first main operating device 220 is identical to the first main operating device 120 of the second embodiment, while the first remote operating device 222 is identical to the first remote operating device 22 of the first embodiment. The first main operating device 220 operates the electrically operated component and the hydraulically operated component in the same manner as the second embodiment. The first remote operating device 222 is operatively connected to the first main operating device 220 by a cable 274 in the same manner that the cable 174 is operatively connected to the first main operating device 120. Since the first bicycle hydraulic operating system 210 of the third embodiment is a combination of the first and second embodiments, the first bicycle hydraulic operating system 210 of the third embodiment will not be discussed in further detail herein.

The second bicycle hydraulic operating system 212 comprises a second main operating device 230 and a second remote operating device 232. The second main operating device 230 and the second remote operating device 232 are mirror images of the first main operating device 220 and the first remote operating device 222, respectively. However, the second main operating device 230 operates a second electrically operated component and a second hydraulically operated component. The second remote operating device 232 is operatively connected to the second main operating device 230 by a cable in the same manner that the cable 274 is operatively connected to the first main operating device 220.

Here in the third embodiment, the first main operating device 220 is configured to operate both the first hydraulically operated component 224 and the first electrically operated component 226, while the first remote operating device 222 is configured to operate only the first hydraulically operated component 224 via the first main operating device 220. The second main operating device 230 is configured to operate both the second hydraulically operated component and the second electrically operated component, while the second remote operating device 232 is configured to operate only the second hydraulically operated component 234 via the second main operating device 230.

Referring now to FIGS. 16 to 20, a portion of a bicycle 300 is illustrated having a drop handlebar 302 that is used to support certain components of a first bicycle hydraulic operating system 310 and a second bicycle hydraulic operating system (not shown) in accordance with a fourth embodiment. The Here in the fourth embodiment, the first bicycle hydraulic operating system 310 comprises a first main operating device 320 and a first remote operating device 322. The first main operating device 320 operates a hydraulically operated component 324. Thus, the first main operating device 320 also can be called as a bicycle hydraulic operating device 320. In view of the similarities with the prior embodiments, the bicycle hydraulic operating system 310 will not be discussed in detail.

Figure 17:
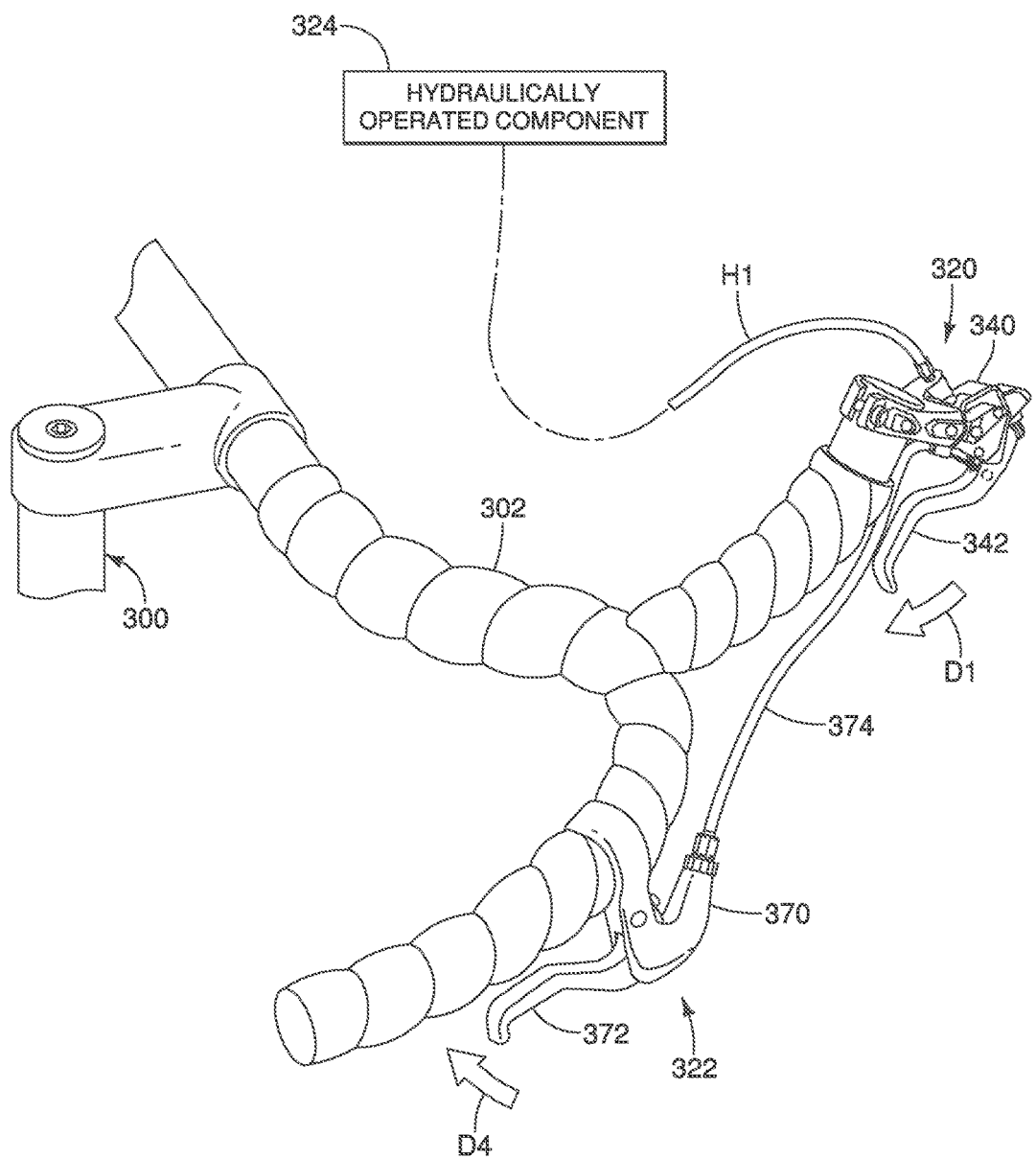
FIG. 17 is a perspective view of the portion of the bicycle illustrated in FIG. 16 but with the main and remote operating devices in their operated positions as a result of the remote operating device being operated.

The main operating device 320 of the bicycle hydraulic operating system 310 basically comprises a first base member 340 and a first operating member 342. The main operating device 320 of the bicycle hydraulic operating system 310 further comprises a hydraulic unit 344 as seen on FIG. 19. The hydraulic unit 344 is disposed on the first base member 340, and is configured to operate a bicycle component (e.g., the hydraulically operated component 324 of FIGS. 16 and 17) in response to operation of the first operating member 342 in a piston operating direction D1 as seen in FIG. 17. The hydraulic unit 344 is fluidly connected to the hydraulically operated component 324 by the hydraulic hose H1. When the hydraulically operated component 324 is a hydraulic brake device, the first operating member 342 is a brake lever.

The first operating member 342 is movably mounted to the first base member 340. The first operating member 342 is a trigger lever that is biased to its rest position such that it automatically returns to its rest position upon being released from an operated position. In particular, the first operating member 342 includes a first mounted portion 342a and a first user operating portion 342b. The first mounted portion 342a is pivotally mounted, about a pivot axis P1.

Figure 18:
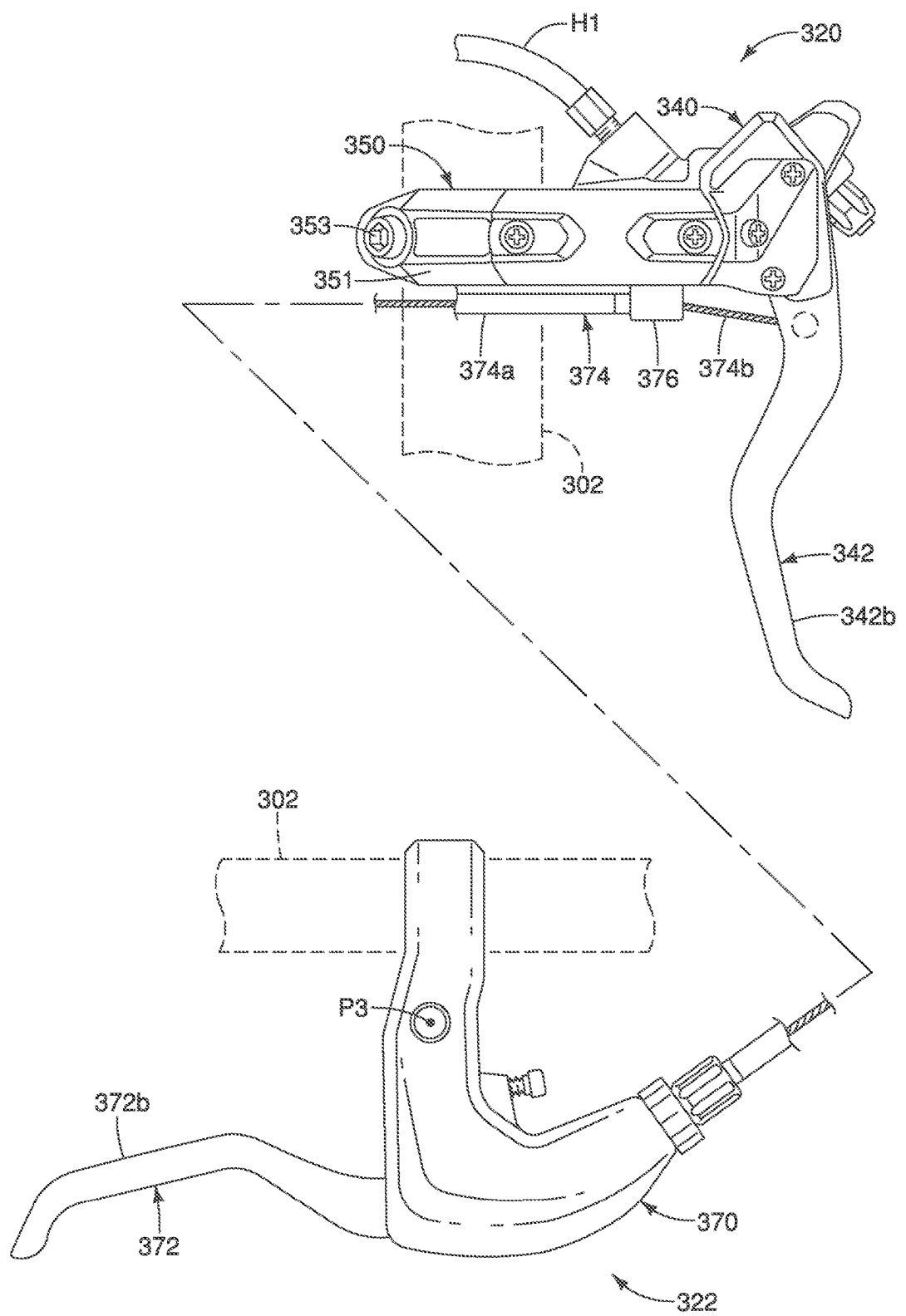
FIG. 18 is a diagrammatic view of the main and remote operating devices of the bicycle hydraulic operating system illustrated in FIGS. 16 and 17 in which the main and remote operating devices are in their rest positions.
Figure 19:
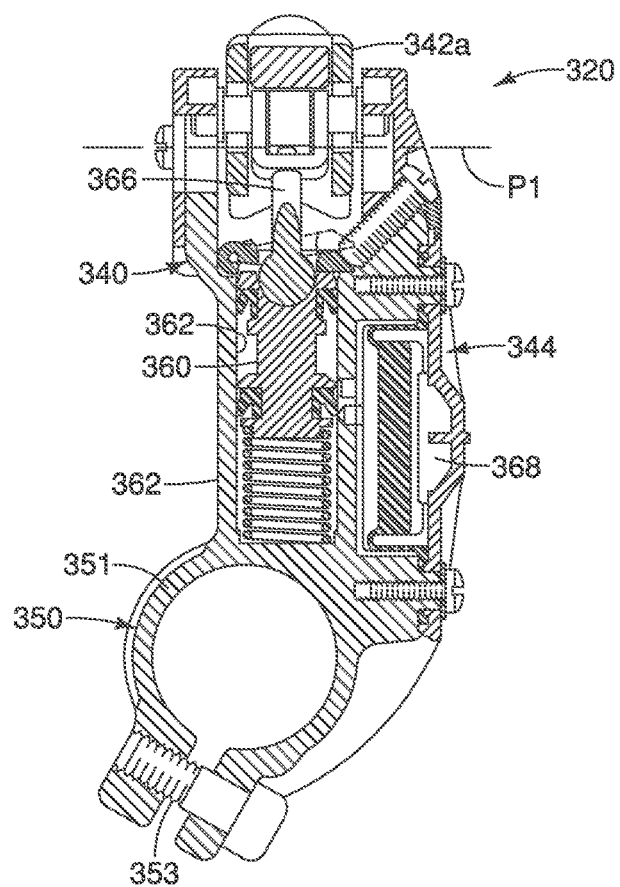
FIG. 19 is a center longitudinal cross sectional view of the main operating device (bicycle hydraulic operating device) illustrated in FIGS. 16 to 18.

Referring now to FIGS. 18 and 19, the first base member 340 includes a first bicycle fixing structure 350. The first bicycle fixing structure 350 is configured to be mounted to a curved portion of the drop handlebar 302. The first bicycle fixing structure 350 is configured engage the exterior surface of the handlebar 302. The first bicycle fixing structure 350 has a clamp 351 and a fixing bolt 353. The fixing bolt 353 is tightened to squeeze the clamp 351 for clamping onto the handlebar 302. In this way, the first base member 340 is secured on the handlebar 302. The first bicycle fixing structure 350 is a conventional bicycle fixing structure, and thus, the first bicycle fixing structure 350 will not be discussed or illustrated in further detail herein.

As mentioned above, the main operating device 320 includes the hydraulic unit 344. Here, as seen in FIG. 19, the main operating device 320 of the bicycle hydraulic operating system 310 comprises a piston 360 that is part of the hydraulic unit 344. The first base member 340 includes a hydraulic cylinder 362 defining a cylinder bore 364. The piston 360 is movably disposed in the cylinder bore 364 of the first base member 340. The first operating member 342 is operatively coupled to the piston 360 to move the piston 360 in the cylinder bore 364 of the first base member 340. In particular, in the fourth embodiment, the first operating member 342 is operatively coupled to the piston 360 by a connecting rod 366 to move the piston 360 inside the cylinder bore 364. In this way, the piston 360 is movably disposed in the cylinder bore 364 along a cylinder axis of the cylinder bore 364 as the first operating member 342 is moved from a rest position to an actuated position. In other words, the first operating member 342 is operatively coupled to the piston 360 to move the piston 360 in the cylinder bore 364 in response to actuation of the first operating member 342 from the rest position to the actuated position. As seen in FIG. 19, the first base member 340 includes a reservoir tank 368 that is fluidly connected to the cylinder bore 364.

Figure 20:
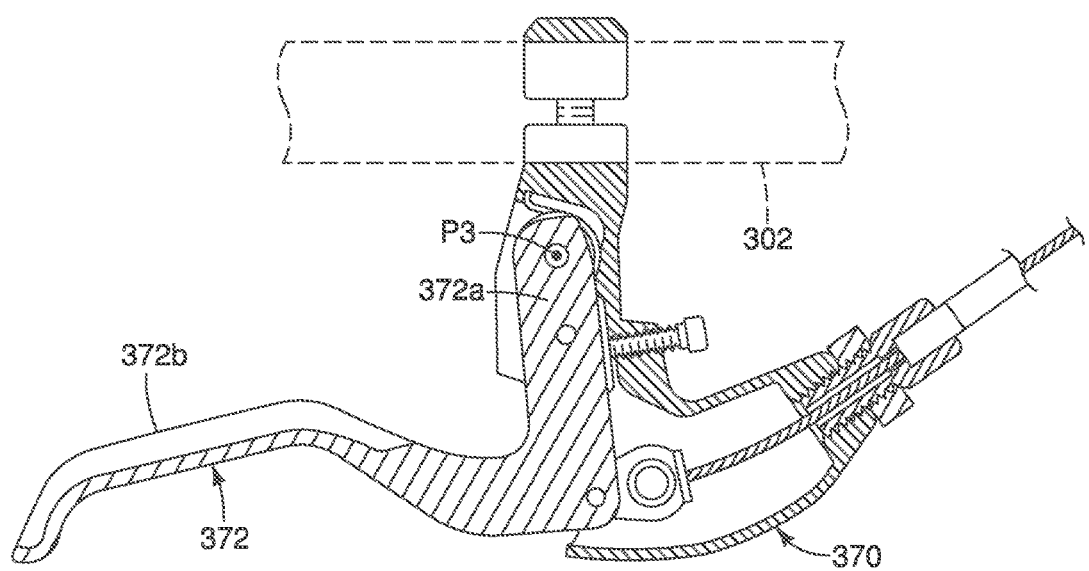
FIG. 20 is a center longitudinal cross sectional view of the remote operating device illustrated in FIGS. 16 to 18.

Referring now to FIGS. 18 and 20, the remote operating device 322 of the bicycle hydraulic operating system 310 will now be discussed in further detail. The remote operating device 322 of the bicycle hydraulic operating system 310 basically comprises a second base member 370 and a second operating member 372. The second operating member 372 is movably mounted to the second base member 370. The second operating member 372 is configured to operate a bicycle component (e.g., the first hydraulically operated component 324) via the first operating member 342 in response to operation of the second operating member 372 being moved in an operating direction D4 as seen in FIG. 17. The second operating member 372 is a trigger lever that is biased to its rest position (non-operated position) such that the second operating member 372 automatically returns to its rest position upon being released from an operated position. The second operating member 372 includes a second mounted portion 372a and a second user operating portion 372b. The second mounted portion 372a is pivotally mounted on the second base member 370 about a pivot axis P3. In the fourth embodiment, the second operating member 372 is an elongated operating lever.

Figure 21:
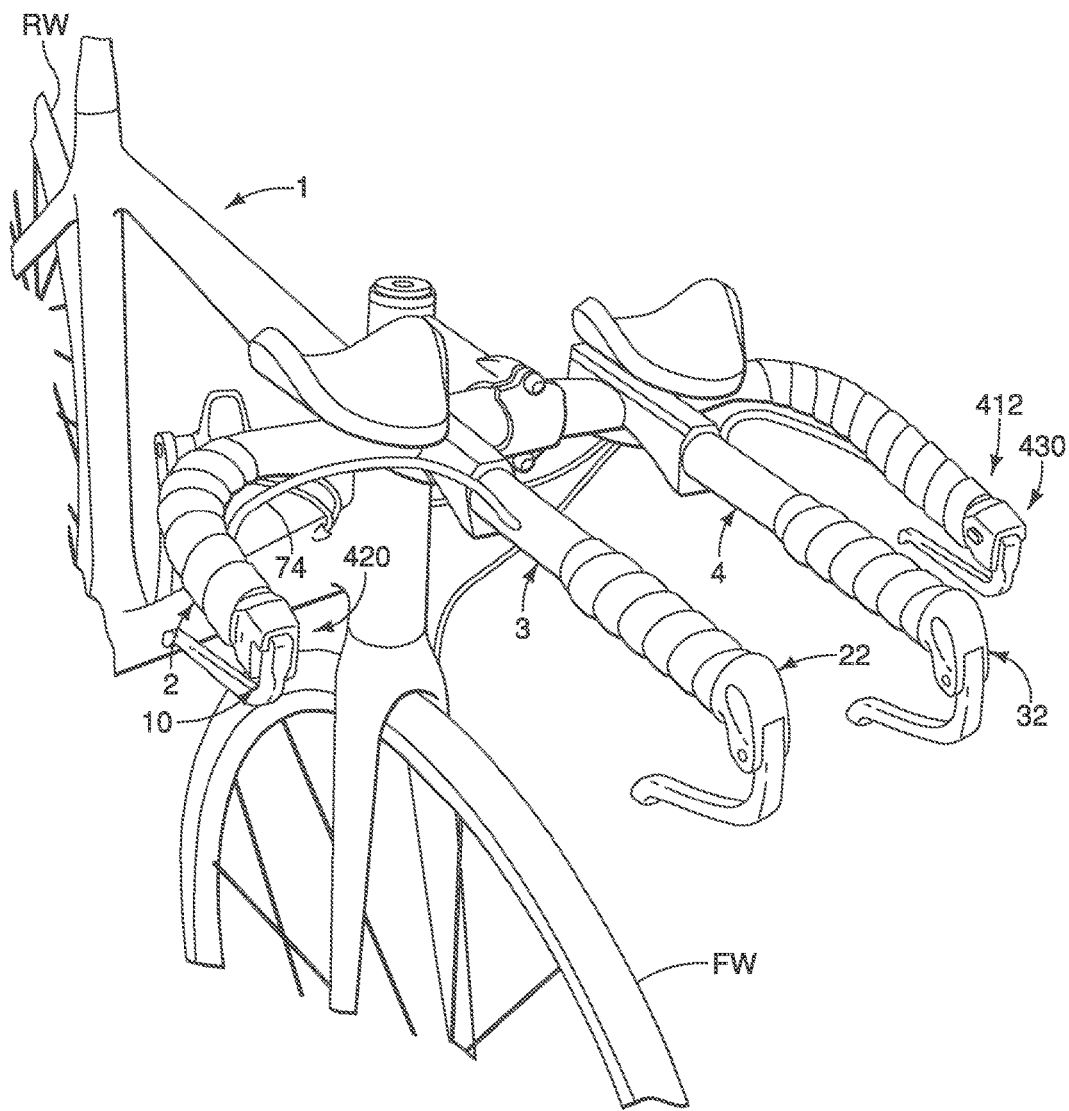
FIG. 21 is a perspective view of a portion of a bicycle that is equipped with a bicycle hydraulic operating system in accordance with a fourth illustrative embodiment in which main and remote bicycle hydraulic operating devices are in their rest positions.
Figure 22:
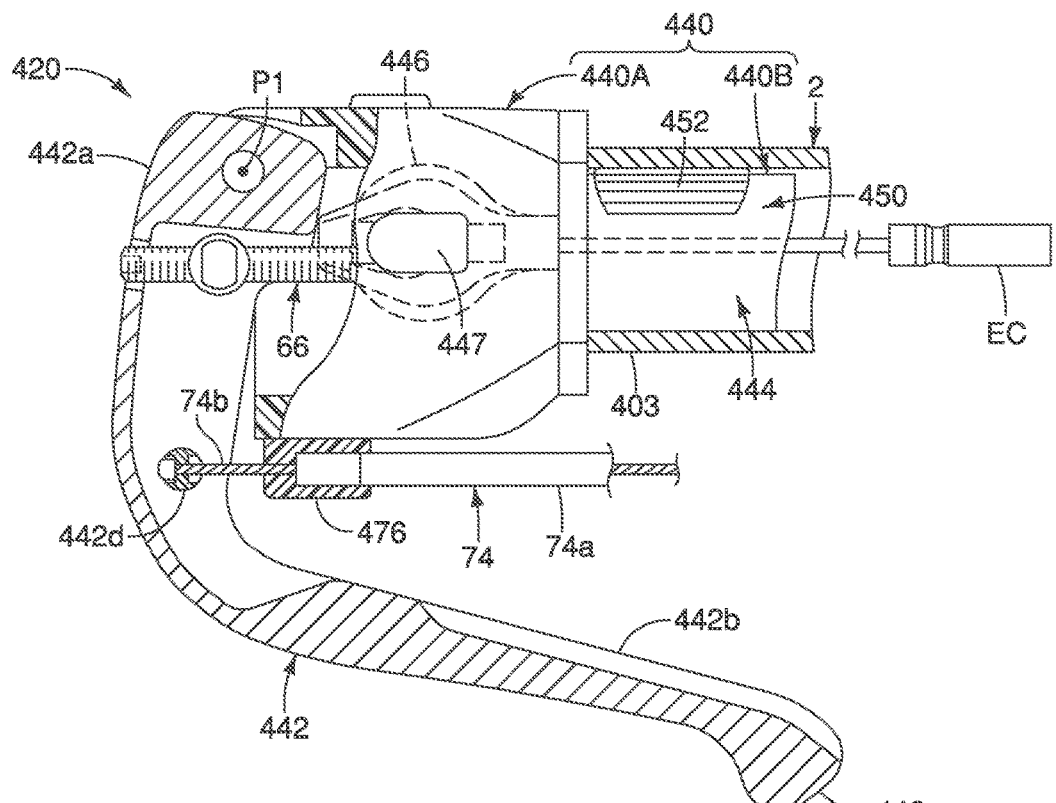
FIG. 22 is an inside elevational view of the main operating device (bicycle hydraulic operating device) illustrated in FIG. 21 with a portion of a base member broken away.
Figure 23:
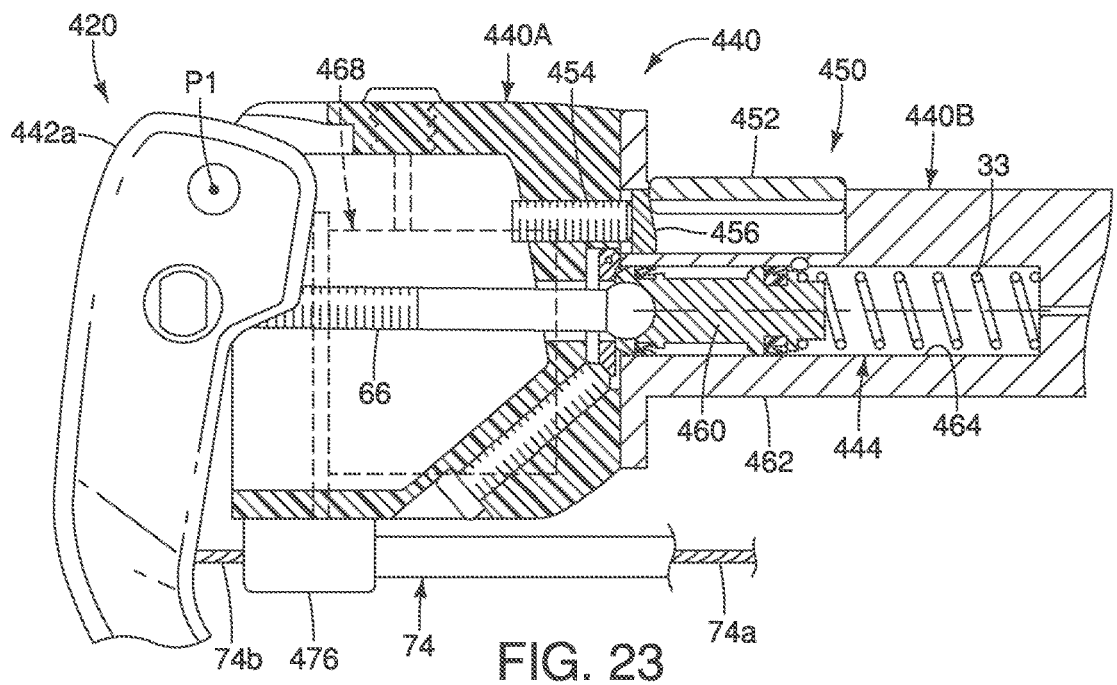
FIG. 23 is a center longitudinal cross section of the main operating device illustrated in FIGS. 21 and 22 showing a hydraulic unit of the main operating device.

Referring now to FIGS. 21 to 23, a bicycle hydraulic operating system 410 in accordance with a fifth embodiment will now be discussed. Here, in the fifth embodiment, the bicycle 1 (also shown in FIG. 1) has been modified such that the main operating devices 20 and 30 have been replaced with a pair of main operating devices 420 and 430 in accordance with a fifth embodiment. Also the mechanical gear shifting devices of the bicycle 1 of the first embodiment have been replaced with electrical gear shifting devices (not shown). As a result, the bicycle hydraulic operating system 510 basically comprises the main operating device 520, the remote operating device 22 of the first embodiment, the hydraulically operated component 24 of the first embodiment and an electrically operated component (not shown). The bicycle 1 of the fifth embodiment also includes a bicycle hydraulic operating system 412 that basically comprises the main operating device 520, the remote operating device 32 of the first embodiment, the hydraulically operated component 34 of the first embodiment and the electrically operated component.

The main operating device 420 of the bicycle hydraulic operating system 410 basically comprises a first base member 440 and a first operating member 442. The cable 74 interconnects the second operating member 72 to the first operating member 442 such that movement of the second operating member 72 moves the first operating member 442. In other words, the second operating member 72 operates the first operating member 442 in the same manner as the first embodiment.

The first base member 440 includes a first base part 440A and a second base part 440B. In the first embodiment, the second base part 440B is detachably coupled to the first base part 440A. In other words, the first base part 440A is separable from the second base part 440B such that the first and second base parts 440A and 440B can be separated and reattached without damaging the first and second base parts 440A and 440B.

The main operating device 420 of the bicycle hydraulic operating system 410 further comprises a hydraulic unit 444 as seen on FIG. 23. The hydraulic unit 444 is a part of the second base part 440B. The hydraulic unit 444 is configured to operate a bicycle component (e.g., the hydraulically operated component 24 of FIG. 2) in response to operation of the first operating member 442 in a piston operating direction. The hydraulic unit 444 is fluidly connected to the hydraulically operated component 24 by a hydraulic hose.

The first operating member 442 is movably mounted to the first base member 440. The first operating member 442 is a trigger lever that is biased to its rest position, such that it automatically returns to its rest position upon being released from an operated position. In particular, the first operating member 442 includes a first mounted portion 442a and a first user operating portion 442b. The first mounted portion 442a is pivotally mounted about a pivot axis P1.

Referring now to FIGS. 22 and 23, the first base member 440 includes a first bicycle fixing structure 450. The first bicycle fixing structure 450 configured to be disposed inside the handlebar 2. The first bicycle fixing structure 450 has a plurality of wedge blocks 452, a pressure exerting member 454 and an expander body 456. Basically, the first bicycle fixing structure 450 is operatively connected to the first base member 440 to vary the effective diameter of the cylindrical portion of the second base part 440B that fits inside the handlebar 2. By varying the effective diameter of the cylindrical portion of the second base part. 440B, the cylindrical portion of the second base part 440R and the wedge blocks 452 engage an interior surface of the handlebar 2. Thus, the first bicycle fixing structure 450 secures the cylindrical portion of the second base part 440B inside the handlebar 2. Preferably, each of the wedge blocks 452 is an arc shaped member with a curved outer peripheral surface has a plurality of grooves for engaging the interior surface of the handlebar 2 when the outer peripheral surfaces of the wedge blocks 452 are pressed against the interior surface of the handlebar 2 during attachment of the main operating device 420 to the handlebar 2.

As mentioned above, the main operating device 420 includes the hydraulic unit 444. Here, as seen in FIG. 23, the main operating device 420 of the bicycle hydraulic operating system 410 comprises a piston 460 that is part of the hydraulic unit 444. The first base member 440 includes a hydraulic cylinder 462 defining a cylinder bore 464. The piston 460 is movably disposed in the cylinder bore 464 of the first base member 440. The first operating member 442 is operatively coupled to the piston 460 to move the piston 460 in the cylinder bore 464 of the first base member 440. In particular, in the first embodiment, the first operating member 442 is operatively coupled to the piston 460 by a connecting rod 466 to move the piston 460 inside the cylinder bore 464. In this way, the piston 460 is movably disposed in the cylinder bore 464 along a cylinder axis of the cylinder bore 464 as the first operating member 442 is moved from a rest position to an actuated position. In other words, the first operating member 442 is operatively coupled to the piston 460 to move the piston 460 in the cylinder bore 464 in response to actuation of the first operating member 442 from the rest position to the actuated position. As seen in FIG. 23, the first base member 440 includes a reservoir tank 468 that is fluidly connected to the cylinder bore 464.

Referring to FIGS. 22 and 23, the first base member 440 includes a cable guide 476. In particular, the cable guide 476 is disposed on the first base part 440A at location adjacent the first user operating portion 442b. The first operating member 442 has a first attachment portion 442d to which the cable 74 is attached. Specifically, the inner wire 74b is attached to the first attachment portion 442d. The first attachment portion 442d is arranged between the pivot axis P1 of the first operating member 442 and the first free end 442c of the first user operating portion 442b.

The main operating device 420 of the bicycle hydraulic operating system 410 further comprises a control unit 446 that is disposed on the first base part 440A of the first base member 440. The control unit 446 is configured to operate an additional component (i.e., an electrically operated component that is not shown). In the fifth embodiment, the control unit 446 includes a printed circuit board having a processor, a memory device and an I/O interface. The control unit 446 includes an electric switch 447. The electric switch 447 is disposed on the first operating member 442, and is electrically connected to the printed circuit board of the control unit 446. An electrical cable EC has one end electrically connected to the printed circuit board of the control unit 446 and the other end provided with an electrically connector for directly or indirectly being electrically connected to an electrically operated component that is not shown.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic operating system. Accordingly, these directional terms, as utilized to describe pans of the bicycle hydraulic operating system should be interpreted relative to a bicycle in an upright riding position on a horizontal surface and that is equipped with the bicycle hydraulic operating system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic operating system comprising:
  a first base member including a first bicycle fixing structure and a hydraulic cylinder defining a cylinder bore;
  a piston movably disposed in the cylinder bore of the first base member;
  a first operating member movably mounted to the first base member and operatively coupled to the piston by a connecting rod to move the piston in the cylinder bore of the first base member;
  a hydraulically operated component connected to the first base member by a hydraulic hose;
  a second base member including a second bicycle fixing structure; and
  a second operating member movably mounted to the second base member and operatively coupled to the piston to move the piston in the cylinder bore of the first base member,
  the second operating member being operatively coupled to the first operating member by a cable interconnecting the second operating member and the first operating member such that movement of the second operating member moves the piston in the cylinder bore of the first base member to operate the hydraulically operated component,
  the first operating member having a first attachment portion provided therein to which the cable is attached, and
  the first attachment portion being provided between a pivot axis of the first operating member and a free end of the first operating member.

2. The bicycle hydraulic operating system according to claim 1, wherein
  the second operating member has a second attachment portion to which the cable is attached.

3. The bicycle hydraulic operating system according to claim 2, wherein
the cable includes an outer casing and an inner wire slidably disposed inside the outer casing, and the inner wire is attached to the first and second attachment portions.

4. The bicycle hydraulic operating system according to claim 1, wherein
the first operating member includes a first mounted portion that is pivotally mounted on the first base member about the pivot axis of the first operating member, and a first user operating portion that extends from the first mounted portion to the free end.

5. The bicycle hydraulic operating system according to claim 1, wherein
the first base member includes a cable guide.

6. The bicycle hydraulic operating system according to claim 5, wherein
the cable guide is disposed outside of the first base member.

7. The bicycle hydraulic operating system according to claim 1, further comprising
a control unit disposed on the first base member, the control unit configured to operate an additional component.

8. The bicycle hydraulic operating system according to claim 7, wherein
the control unit includes an electric switch.

9. The bicycle hydraulic operating system according to claim 8, wherein
the first operating member includes a first mounted portion that is pivotally mounted on the first base member about the pivot axis of the first operating member, and a first user operating portion that extends from the first attachment portion to the free end, the electric switch being disposed on the first user operating portion of the first operating member.

10. The bicycle hydraulic operating system according to claim 8, further comprising
a wireless communication unit electrically coupled to the electric switch.

11. The bicycle hydraulic operating system according to claim 1, wherein
the first base member includes a gripping section configured to be gripped by a user, a handlebar receiving recess arranged at a first end portion of the gripping section and a pommel section extending from the gripping section at a second end portion of the gripping section opposite to the first end portion.

12. The bicycle hydraulic operating system according to claim 11, wherein
the first operating member includes a first mounted portion that is pivotally mounted to the second end portion about the pivot axis of the first operating member, and a first user operating portion that extends from the second end portion to the free end; and
the first base member includes a cable guide that is disposed on the gripping section.

13. The bicycle hydraulic operating system according to claim 1, wherein
the first base member includes a through-hole through which the cable passes.

14. The bicycle hydraulic operating system according to claim 1, wherein
the second operating member has a second attachment portion provided therein to which the cable is attached, and the second attachment portion is provided on an opposite side of a pivot axis of the second operating member from a free end of the second operating member.

* * * * *